(12) United States Patent
Bando et al.

(10) Patent No.: US 12,105,523 B2
(45) Date of Patent: Oct. 1, 2024

(54) WORK VEHICLE

(71) Applicant: Hitachi Construction Machinery Co., Ltd., Tokyo (JP)

(72) Inventors: Mikio Bando, Chiyoda-ku (JP); Shinichi Uotsu, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 111 days.

(21) Appl. No.: 17/782,036

(22) PCT Filed: Mar. 17, 2021

(86) PCT No.: PCT/JP2021/010748
§ 371 (c)(1),
(2) Date: Jun. 2, 2022

(87) PCT Pub. No.: WO2021/193269
PCT Pub. Date: Sep. 30, 2021

(65) Prior Publication Data
US 2023/0004171 A1  Jan. 5, 2023

(30) Foreign Application Priority Data
Mar. 26, 2020 (JP) ................................. 2020-055684

(51) Int. Cl.
*G05D 1/00* (2024.01)
(52) U.S. Cl.
CPC ........... *G05D 1/0278* (2013.01); *G05D 1/027* (2013.01)
(58) Field of Classification Search
CPC .... B62D 15/029; G05D 1/0278; G05D 1/027; G05D 2201/0202; G05D 2201/0201; A01B 69/00; A01B 69/007
See application file for complete search history.

(56) References Cited

U.S. PATENT DOCUMENTS 8,224,525 B1 * 7/2012 Rapoport ............. A01B 69/007
701/34.2
10,661,830 B1 * 5/2020 Gunbatar ............. G01C 21/165
(Continued)

FOREIGN PATENT DOCUMENTS

EP   1 837 675 A1   9/2007
JP   4-359113 A    12/1992
(Continued)

OTHER PUBLICATIONS

International Search Report (PCT/ISA/210) issued in PCT Application No. PCT/JP2021/010748 dated with May 11, 2021 English translation (six (6) pages).
(Continued)

*Primary Examiner* — Wilson W Tsui
(74) *Attorney, Agent, or Firm* — Crowell & Moring LLP

(57) ABSTRACT

The present disclosure provides a work vehicle that allows detecting an error in an installation position of an antenna more flexibly than a conventional device. The work vehicle includes a control device 150. The control device 150 has a detection function F106, a calculation function F104, a calculation function F105, a calculation function F107, and an estimation function F110. The detection function F106 detects steady traveling based on a velocity, an acceleration, and an angular velocity of a vehicle. The calculation function F104 calculates a first vehicle direction based on installation information of a first antenna and a second antenna with respect to the vehicle. The calculation function F105 calculates a second vehicle direction based on a time change of position information of the first antenna when the steady traveling is detected. The calculation function F107 calculates a direction correction parameter for correcting the first vehicle direction based on the second vehicle direction. The estimation function F110 estimates a location and a
(Continued)

posture of the vehicle based on the direction correction parameter and the first vehicle direction.

5 Claims, 17 Drawing Sheets

(56) References Cited

U.S. PATENT DOCUMENTS

| | | | | |
|---|---|---|---|---|
| 2005/0267684 | A1* | 12/2005 | Kawakami | B62D 15/026 180/170 |
| 2009/0099730 | A1* | 4/2009 | McClure | G05D 1/0278 701/41 |
| 2009/0164067 | A1* | 6/2009 | Whitehead | A01B 79/005 701/41 |
| 2010/0292921 | A1* | 11/2010 | Zachariah | G06Q 50/30 701/533 |
| 2016/0116289 | A1* | 4/2016 | Friend | G01S 19/393 701/518 |
| 2017/0144704 | A1* | 5/2017 | Robinson | B62D 15/025 |
| 2017/0146667 | A1 | 5/2017 | Medagoda et al. | |
| 2018/0144637 | A1* | 5/2018 | Ikedo | G08G 1/166 |
| 2019/0369640 | A1 | 12/2019 | He et al. | |
| 2021/0000004 | A1* | 1/2021 | Robinson | B62D 15/0295 |
| 2022/0026588 | A1* | 1/2022 | Valtersson | G01S 19/53 |

FOREIGN PATENT DOCUMENTS

| | | | |
|---|---|---|---|
| JP | 2002-358122 | A | 12/2002 |
| JP | 2005-43212 | A | 2/2005 |
| JP | 2013-169931 | A | 9/2013 |
| JP | 2013-170903 | A | 9/2013 |
| JP | 2013-228318 | A | 11/2013 |
| WO | WO 2006/067968 | A1 | 6/2006 |
| WO | WO 2007/066695 | A1 | 6/2007 |

OTHER PUBLICATIONS

Japanese-language Written Opinion (PCT/ISA/237) issued in PCT Application No. PCT/JP2021/010748 dated May 11, 2021 (four (4) pages).
Extended European Search Report issued in European Application No. 21775765.7 dated Jan. 23, 2024 (11 pages).

* cited by examiner

Fig. 4

| Time | t | t-1 | ... | t-m | ... |
|---|---|---|---|---|---|
| Angular Velocity | w(t) | w(t-1) | ... | w(t-m) | ... |
| Acceleration | a(t) | a(t-1) | ... | a(t-m) | ... |
| Velocity | v(t) | v(t-1) | ... | v(t-m) | ... |
| Elevation State | h(t) | h(t-1) | ... | h(t-m) | ... |

T1

WORK VEHICLE

TECHNICAL FIELD

The present disclosure relates to a work vehicle.

BACKGROUND ART

Conventionally, there has been known an invention that relates to a method of deciding a carrier phase integer value bias when a radio wave is received from a transmitter, such as a GPS satellite, which transmits a positioning signal to conduct a carrier differential positioning, and a method of measuring the azimuth and posture of an object or a moving body and the device thereof (see Patent Literature 1 below).

The azimuth and posture measuring device described in Patent Literature 1 is composed of a carrier phase integer value bias deciding device and means for obtaining an azimuth or a posture (such as claim 5). The carrier phase integer value bias deciding device includes first and second antennas, antenna azimuth observing means, and means for conducting calculation, correction, and decision (such as claim 4). The above-described antenna azimuth observing means receives positioning signals from a plurality of positioning transmitters at the respective first and second antennas and obtains the azimuth of the second antenna with respect to the first antenna based on a carrier phase change amount of the positioning signals.

The above-described means for conducting calculation, correction, and decision operates as described below. First, the azimuth of the second antenna with respect to the first antenna, a distance between the first and second antennas, and a calculated phase difference as a calculational carrier phase difference that can be obtained from the positions of the positioning transmitters are calculated. Further, an observed phase difference as the decimal part of the carrier phase difference of the positioning signals received at the first and second antennas is obtained, and the calculated phase difference is corrected such that the decimal part of the calculated phase difference corresponds to the observed phase difference in a range of ±0.5 cycle. Then, the calculated phase difference after the correction is decided as an integer value bias of the observed phase difference (such as claim 4).

The above-described means for obtaining an azimuth or a posture obtains a relative position of the second antenna with respect to the first antenna from the integer value bias and the observed phase difference that are obtained by the above-described carrier phase integer value bias deciding device, and obtains the azimuth or the posture between the first and second antennas from the relative position (such as claim 5).

The above-described azimuth and posture measuring device has the first and second antennas disposed in a moving body that advances in a front-rear direction on an approximately horizontal surface, and the antenna azimuth observing means observes an advance azimuth of the moving body based on a carrier phase change amount of the positioning signals by movement of the first and second antennas accompanied by movement of the moving body. Furthermore, the azimuth and posture measuring device regards the advance azimuth as a front azimuth of the moving body and observes the azimuth of the second antenna with respect to the first antenna from the front azimuth of the moving body and a mounting position relationship of the first and second antennas with respect to the moving body (such as claim 7).

CITATION LIST

Patent Literature

SUMMARY OF INVENTION

Technical Problem

For example, a work vehicle, such as a dump truck, includes a first antenna and a second antenna that receive radio waves of a satellite positioning system, such as a global navigation satellite system (GNSS), similarly to the conventional azimuth and posture measuring device described above to measure a vehicle direction. The antennas are installed, for example, at the leading ends of poles extending upward from a vehicle body to avoid the radio waves being blocked by the vehicle body.

In the work vehicle, for example, vibration or impact acts on the antennas in some cases by loading ores, earth and sand, and the like, and unloading a loaded object thereof, and traveling on the ground having large unevenness. Therefore, with the passage of time, an error occurs between the actual installation positions of the antennas and preliminarily set installation positions, and an error occurs between the vehicle direction calculated based on the set installation positions and the actual vehicle direction in some cases.

In this case, the conventional azimuth and posture measuring device observes an advance azimuth of a moving body based on movement of the first and second antennas accompanied by movement of the moving body that advances in a front-rear direction on an approximately horizontal surface. However, in mining sites of ores and construction sites where the work vehicle travels, an opportunity for the work vehicle to advance in the front-rear direction on the approximately horizontal surface is limited. Therefore, in the work vehicle, it is demanded that, not under this limited condition but more flexibly, an error in the installation positions of the antennas is detected.

The present disclosure provides a work vehicle that allows detecting an error in the installation position of an antenna more flexibly than a conventional device.

Solution to Problem

One aspect of the disclosure is a work vehicle that comprises: a vehicle; a first antenna and a second antenna mounted to the vehicle to receive a radio wave of a satellite positioning system; a receiver that outputs position information of the first antenna based on the radio wave and a baseline direction connecting the first antenna to the second antenna; a sensor that measures a velocity, an acceleration, and an angular velocity of the vehicle; and a control device that estimates a location and a posture of the vehicle. The control device has: a detection function of detecting a steady traveling based on the velocity, the acceleration, and the angular velocity; a function of calculating a first vehicle direction based on installation information of the first antenna and the second antenna with respect to the vehicle; a function of calculating a second vehicle direction based on a time change of the position information of the first antenna when the steady traveling is detected; a function of calculating a direction correction parameter for correcting the first vehicle direction based on the second vehicle direction; and an estimation function of estimating the location and the posture of the vehicle based on the direction correction parameter and the first vehicle direction.

Advantageous Effects of Invention

With one aspect of this disclosure described above, a work vehicle that allows detecting an error in the installation position of an antenna more flexibly than a conventional device can be provided.

BRIEF DESCRIPTION OF DRAWINGS

FIG. 4 is a table describing a process of storing sensor information in FIG. 3.

DESCRIPTION OF EMBODIMENTS

The following will describe embodiments of a work vehicle according to this disclosure with reference to the drawings.

Embodiment 1

Figure 1:
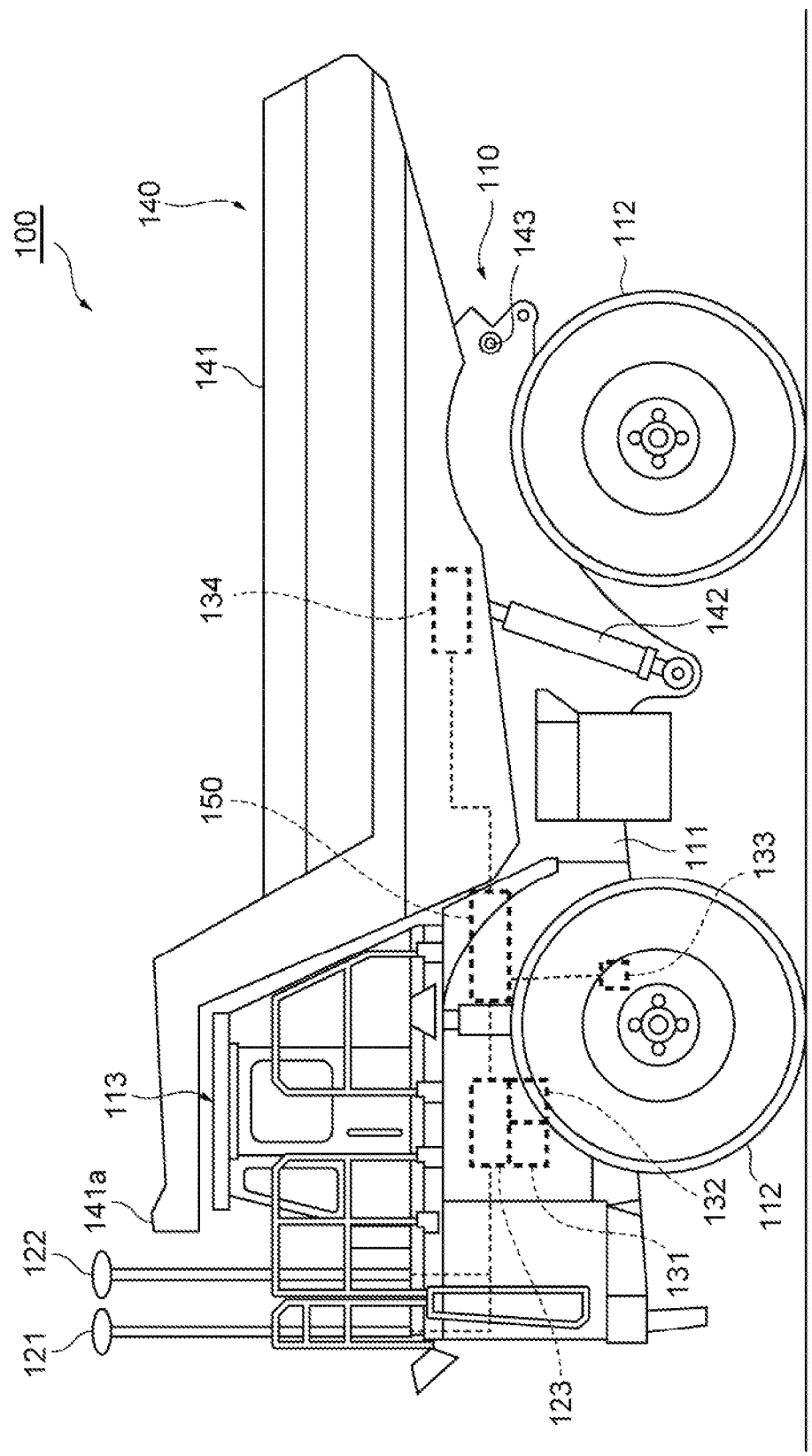
FIG. 1 is a side view illustrating Embodiment 1 of a work vehicle according to this disclosure.
Figure 2:
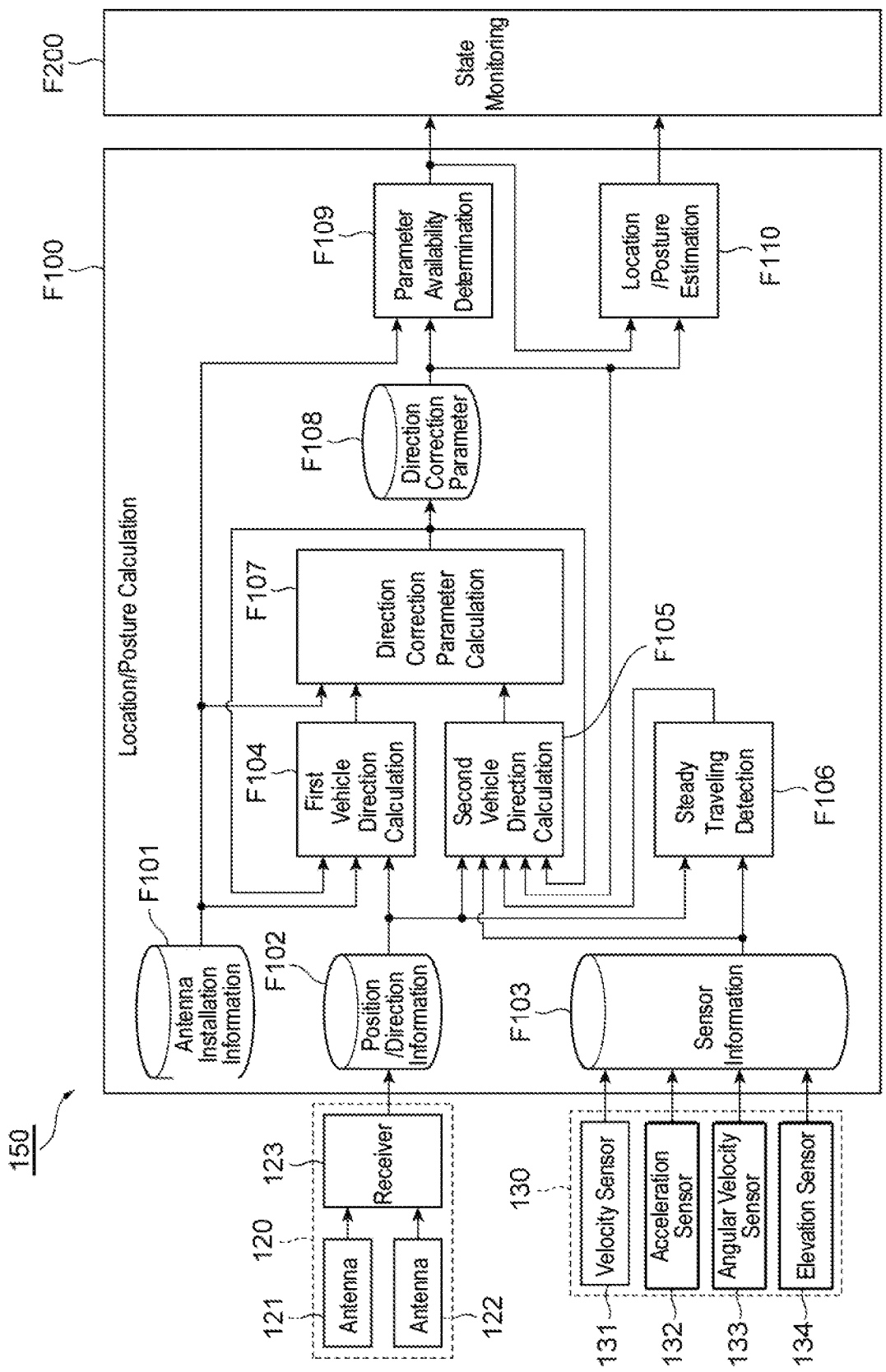
FIG. 2 is a function block diagram of a control device of the work vehicle in FIG. 1.

FIG. 1 is a side view illustrating Embodiment 1 of a work vehicle according to this disclosure. FIG. 2 is a function block diagram of a control device 150 of a work vehicle 100 in FIG. 1. The work vehicle 100 of this embodiment is, for example, a dump truck used in mining sites of ores and construction sites. The work vehicle 100 includes, for example, a vehicle 110, a positioning apparatus 120, sensors 130, a vessel 140, and the control device 150.

The vehicle 110 includes, for example, a vehicle body frame 111, wheels 112, and a cabin 113. The vehicle body frame 111 is, for example, a ladder-shaped structure. The vehicle body frame 111 supports, for example, the right and left wheels 112 mounted to axles via suspensions. Further, the vehicle body frame 111 supports, for example, an engine, an electric generator, a motor, a power transmission mechanism, a steering mechanism, a hydraulic device, an actuator for vehicle control, and the like that are not illustrated.

The wheels 112 are, for example, coupled to the motor via the power transmission mechanism and driven by the motor to cause the vehicle 110 to travel. The cabin 113 is a compartment for an operator of the work vehicle 100 to get in. Inside the cabin 113, for example, a steering wheel, an operating pedal, an operating lever, an information device, a speaker, a measuring instrument, an indicator lamp, and the like that are not illustrated are installed.

The positioning apparatus 120 can be configured by, for example, a satellite positioning system, such as a global navigation satellite system (GNSS). The positioning apparatus 120 includes, for example, a first antenna 121, a second antenna 122, and a receiver 123. The first antenna 121 and the second antenna 122 are, for example, mounted to the vehicle 110 and receive radio waves of the satellite positioning system, such as GNSS.

The first antenna 121 and the second antenna 122 are, for example, installed separately in a width direction of the vehicle 110 perpendicular to a front-rear direction and a height direction of the vehicle 110. The first antenna 121 and the second antenna 122 are, for example, mounted to the leading ends of poles secured to the vehicle 110 and installed at positions higher than a steady position of a front-end section 141a of a vessel main body 141.

The receiver 123 is, for example, coupled to the first antenna 121 and the second antenna 122 via signal cables. The receiver 123 outputs position information of the first antenna 121 and a baseline direction between the first antenna 121 and the second antenna 122 based on the radio waves received by the first antenna 121 and the second antenna 122. Here, the baseline direction is, for example, a direction of a straight line connecting the installation position of the first antenna 121 to the installation position of the second antenna 122.

The sensors 130 include, for example, a velocity sensor 131, an acceleration sensor 132, and an angular velocity sensor 133. Further, in the example illustrated in FIG. 1 and FIG. 2, the sensors 130 include, for example, an elevation sensor 134. The sensors 130 are, for example, coupled communicatively to the control device 150 via a control area network (CAN). When a velocity of the vehicle 110 is calculated by the control device 150 based on a location measured by the positioning apparatus 120, the positioning apparatus 120 may be used as a velocity sensor and the velocity sensor 131 may be omitted.

The velocity sensor 131 detects, for example, a velocity of the vehicle 110 based on a rotational speed of the wheels 112 and outputs the velocity to the control device 150. The acceleration sensor 132 detects, for example, an acceleration of the vehicle 110 excluding a gravitation acceleration and outputs the acceleration to the control device 150. The angular velocity sensor 133 detects, for example, an angular velocity of the vehicle 110 and outputs the angular velocity to the control device 150. The elevation sensor 134 detects, for example, an elevation state of the vessel main body 141 including strokes of elevating cylinders 142 that elevate the vessel main body 141 and outputs the elevation state to the control device 150.

The vessel 140 has, for example, the vessel main body 141, the elevating cylinders 142, and a rotation shaft 143. The vessel main body 141 is, for example, rotatably supported on the vehicle body frame 111 centering around the rotation shaft 143 disposed on the rear side of a bottom section. The vessel main body 141 is, for example, a section for loading and transporting loaded objects, such as ores, rocks, gravel, and earth and sand, in the work vehicle 100.

The elevating cylinders 142 are, for example, a pair of hydraulic cylinders disposed on both sides in the width direction of the vehicle 110. In the elevating cylinder 142, the leading end of a piston rod is coupled to a front with respect to the rotation shaft 143 on the bottom section of the vessel main body 141, and the end section of a cylinder tube on the opposite side of the piston rod is coupled to the lower section of the vehicle body frame 111. The elevating cylinders 142 constitute a part of the hydraulic device controlled by the control device 150. The elevating cylinders 142 rotate the vessel main body 141 centering around the rotation shaft 143 by expanding and contracting the piston rods to elevate the front-end section 141a of the vessel main body 141.

The control device 150 is, for example, a computer system, such as a microcontroller or firmware. The control device 150 is, for example, composed of a central processing unit (CPU), a storage device, such as RAM and ROM, programs and data stored in the storage device, timers, and an input/output section that inputs and outputs signals. The control device 150 and the sensors 130 are, for example, each time synchronized and operate at a constant cycle, therefore avoiding failure in capturing signals due to deviation in time. A driving cycle of the control device 150 can be equalized to, for example, the shortest output cycle of the sensors 130.

As illustrated in FIG. 2, the control device 150 has, for example, a function F100 of calculating a location and a posture of the work vehicle 100 and a function F200 of monitoring a state of the work vehicle 100. The functions of the control device 150 can be achieved by, for example, executing a program stored in the storage device of the control device 150 by the CPU. In the following description, the function F100 of calculating the location and the posture of the work vehicle 100 is abbreviated as a calculation function F100, and the function F200 of monitoring the state of the work vehicle 100 is abbreviated as a state monitoring function F200 in some cases.

In the example illustrated in FIG. 2, the calculation function F100 of the control device 150 has, for example, a function F101 of storing antenna installation information, a function F102 of storing position and direction information, a function F103 of storing sensor information, and a function F108 of storing a direction correction parameter. In the following description, the respective functions of the control device 150 are abbreviated as storage functions F101, F102, F103, and F108 in some cases.

In the example illustrated in FIG. 2, the calculation function F100 of the control device 150 further has a function F104 of calculating a first vehicle direction, a function F105 of calculating a second vehicle direction, a function F106 of detecting steady traveling, and a function F107 of calculating the direction correction parameter. In the following description, the respective functions of the control device 150 are abbreviated as calculation functions F104 and F105, a detection function F106, and a calculation function F107 in some cases.

In the example illustrated in FIG. 2, the calculation function F100 of the control device 150 further has a function F109 of determining availability of the direction correction parameter and a function F110 of estimating the location and the posture of the work vehicle 100. In the following description, the respective functions of the control device 150 are abbreviated as a determination function F109 and an estimation function F110 in some cases.

Figure 3:
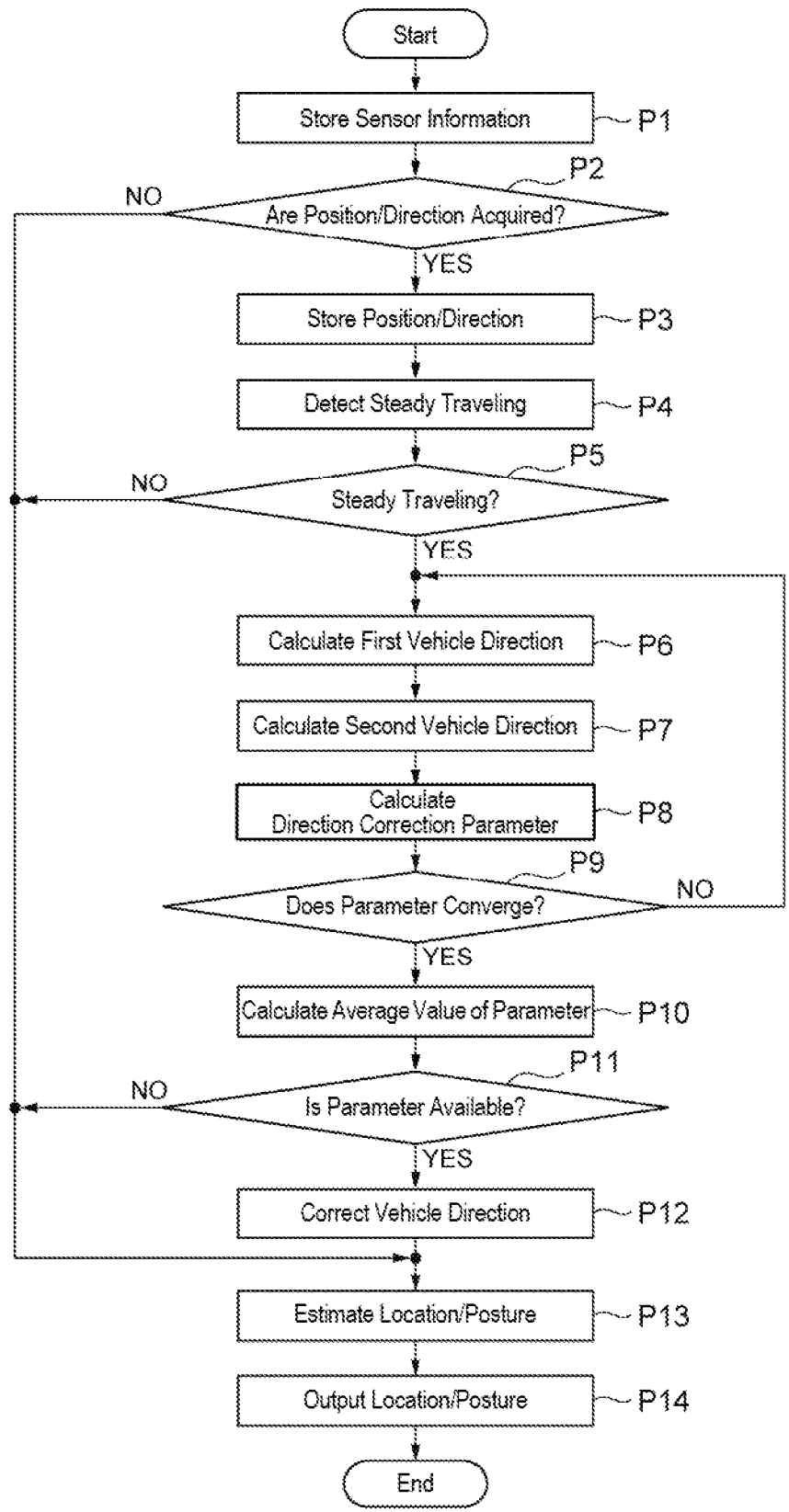
FIG. 3 is a flowchart illustrating one example of processes by the control device of the work vehicle in FIG. 1.

FIG. 3 is a flowchart illustrating one example of processes by the control device 150 of the work vehicle 100 in FIG. 1. The control device 150 performs the processes illustrated in FIG. 3 by, for example, the calculation function F100. Specifically, once starting the processes illustrated in FIG. 3, the control device 150 performs Process P1 of storing the sensor information by, for example, the storage function F103. In Process P1, the storage function F103 stores the sensor information input from the sensors 130 via the input/output section of the control device 150 in the storage device constituting the control device 150.

FIG. 4 is Table T1 illustrating one example of the sensor information stored by the storage function F103 in Process P1. The sensor information includes, for example, a velocity v, an acceleration a, an angular velocity w, and an elevation state h that are output values respectively from the velocity sensor 131, the acceleration sensor 132, the angular velocity sensor 133, and the elevation sensor 134 that are included in the sensors 130. Further, the sensor information includes, for example, times t, t-1, . . . , t-m, . . . when the respective output values are output. The storage device of the control device 150 stores, for example, the sensor information for a certain period including the sensor information at a current time t and the sensor information at times t-1, . . . , t-m, . . . before the current time t.

The certain period for which the sensor information is stored in the storage device of the control device 150 is at least a period equal to or longer than a cycle in which both the position information of the first antenna 121 and the baseline direction connecting the first antenna 121 to the second antenna 122 are output from the receiver 123. The velocity, the acceleration, and the angular velocity included in the sensor information may be the output values of the velocity sensor 131, the acceleration sensor 132, and the angular velocity sensor 133 or may be values in three-dimensional notation into which the output values of the respective sensors are converted by vehicle coordinates.

Next, for example, the control device 150 performs Process P2 of determining whether or not both the position information of the first antenna 121 and the baseline direction connecting the first antenna 121 to the second antenna 122 are acquired from the receiver 123. The position information of the first antenna 121 is position information of the first antenna 121 output from the receiver 123 as a result of a signal being input to the receiver 123 from the first antenna 121 that has received the radio waves of GNSS. The baseline direction is, for example, a direction of the straight line connecting the first antenna 121 to the second antenna 122, which is output from the receiver 123, as a result of a signal being input to the receiver 123 from the first antenna 121 and the first antenna 121 that have received the radio waves of GNSS.

The storage function F102 of the control device 150 acquires, for example, the position information of the first antenna 121 and the baseline direction from the receiver 123 each at a constant cycle and stores the position information of the first antenna 121 and the baseline direction in the storage device of the control device 150. Accordingly, in Process P2, for example, the control device 150 determines whether or not both the position information of the first antenna 121 and the baseline direction connecting the first antenna 121 to the second antenna 122 are acquired from the receiver 123.

Specifically, for example, assume that, from the receiver 123, the position information of the first antenna 121 is output at a cycle of 1 [Hz], and the baseline direction connecting the first antenna 121 to the second antenna 122 is output at a cycle of 10 [Hz]. In this case, in Process P2, the control device 150 determines that the position information of the first antenna 121 has not been acquired (NO) at the time when only the baseline direction is acquired from the receiver 123 and performs Process P13 described later. On the other hand, in Process P2, when the control device 150 determines that both the position information of the first antenna 121 and the baseline direction are acquired (YES), the control device 150 performs the next Process P3.

Figure 5:
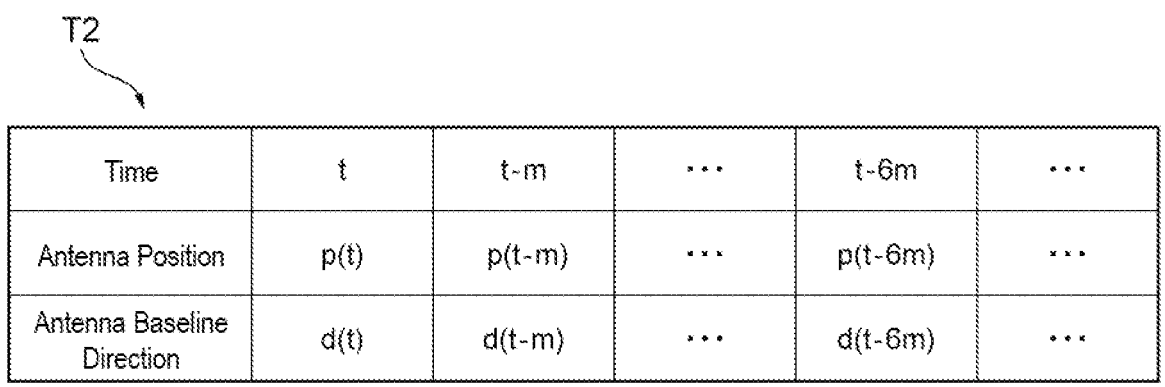
FIG. 5 is a table describing a process of storing a position and a direction in FIG. 3.

FIG. 5 is Table T2 illustrating one example of position information p of the first antenna 121 and a baseline direction d that are stored in the storage device of the control device 150 in Process P3. In Process P3, for example, the control device 150 stores the position information p of the first antenna 121 and the baseline direction d that are acquired from the receiver 123 by the storage function F102 together with the acquired times t, t-m, . . . , t-6m, . . . in the storage device.

FIG. 5 indicates an example in which both the position information p of the first antenna 121 and the baseline direction d are output every cycle m. The position information p of the first antenna 121 is, for example, information indicative of a point on a map and two-dimensional or three-dimensional position information. The baseline direction d connecting the first antenna 121 to the second antenna 122 is, for example, a two-dimensional or three-dimensional vector or an azimuth. As illustrated in FIG. 3, after Process P3 ends, the control device 150 performs the next Process P4.

Figure 6:
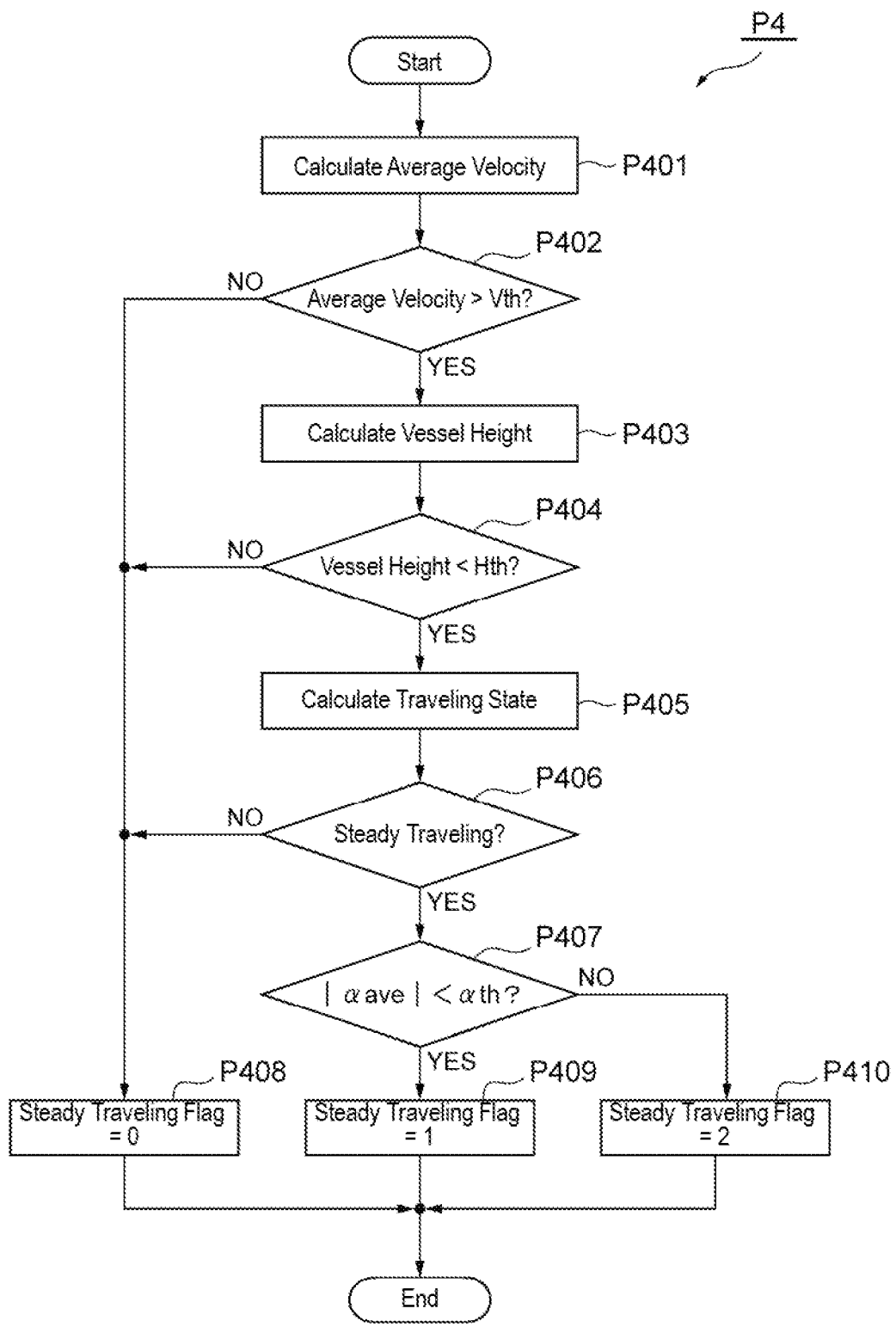
FIG. 6 is a flowchart of a process of detecting steady traveling in FIG. 3.

FIG. 6 is a flowchart of Process P4 of detecting the steady traveling in FIG. 3. Each process illustrated in FIG. 6 can be performed by, for example, the detection function F106 of the control device 150. Once starting Process P4, the control device 150 first performs Process P401 of calculating an average velocity. Specifically, in Process P401, for example, the control device 150 refers to the storage device, and refers to the time when the position information p of the first antenna 121 one cycle before is acquired from the positioning apparatus 120. Furthermore, for example, the control device 150 uses the velocity v of the vehicle 110 from the time when the position information p of the first antenna 121 one cycle before is acquired to the present to calculate the average velocity of the vehicle 110.

Next, the control device 150 performs Process P402 of determining whether or not the calculated average velocity of the vehicle 110 is higher than a predetermined velocity threshold Vth. In Process P402, for example, when the control device 150 determines that the calculated average velocity of the vehicle 110 is equal to or lower than the predetermined velocity threshold Vth (NO), the control device 150 performs the next Process P408.

In Process P408, the control device 150 sets a steady traveling flag stored in the storage device to zero and ends the processes illustrated in FIG. 6. The state where the steady traveling flag is zero indicates that the work vehicle 100 is not performing the steady traveling. That is, the steady traveling has an average value of the velocity of the vehicle 110 higher than the predetermined velocity threshold Vth. This excludes the vehicle 110 standing still or low velocity traveling at the velocity threshold Vth or lower from the steady traveling.

On the other hand, in Process P402, for example, when the control device 150 determines that the calculated average velocity of the vehicle 110 is higher than the predetermined velocity threshold Vth (YES), the control device 150 performs the next Process P403. In Process P403, the control device 150 calculates, for example, the height of the vessel 140. Specifically, for example, the control device 150 refers to the storage device to calculate the height of the vessel 140 based on the elevation state of the vessel 140 at the current time and at the time when the output of the positioning apparatus 120 one cycle before is acquired. Here, the height of the vessel 140 is, for example, the height of the front-end section 141a of the vessel main body 141.

For example, assume that the elevation state of the vessel 140 is stored as an angle of the vessel main body 141 in the storage device of the control device 150. In this case, for example, the control device 150 uses the sine of the angle of the vessel main body 141 to be able to obtain the height of the front-end section 141a of the vessel main body 141. Dimension data of the vessel main body 141 is, for example, preliminarily stored in the storage device of the control device 150. After Process P403 ends, the control device 150 performs the next Process P404.

In Process P404, for example, the control device 150 determines whether or not the height of the vessel 140 calculated in Process P403 is lower than a predetermined height threshold Hth. More specifically, for example, the control device 150 determines whether or not each height of the vessel 140 at the current time and at the time when the position information p is acquired from the positioning apparatus 120 at the previous time is lower than the height threshold Hth. Here, for example, the height threshold Hth can be set to a height equal to the height of the first antenna 121 or the second antenna 122, or to the lower height of those of the first antenna 121 and the second antenna 122.

In Process P404, assume that the control device 150 determines, for example, that the height of the vessel 140 is equal to or higher than the height threshold Hth (NO) at both or one of the current time and the time when the position information p is acquired from the positioning apparatus 120 at the previous time. In this case, the control device 150 performs the above-described Process P408 of setting the steady traveling flag to zero and ends Process P4 illustrated in FIG. 6.

Further, in Process P404, assume that the control device 150 determines, for example, that the height of the vessel 140 is lower than the height threshold Hth (YES) at both or one of the current time and the time when the position information p is acquired from the positioning apparatus 120 at the previous time. In this case, for example, the control device 150 performs Process P405 of calculating a traveling state of the work vehicle 100. More specifically, in Process P405, the control device 150 calculates each average value of an angular velocity, an angular acceleration, and an acceleration of the work vehicle 100 and a change in the direction of the vehicle 110.

Here, each average value of the angular velocity, the angular acceleration, and the acceleration of the work vehicle 100 is, for example, an average value from the time when the position information p is acquired from the positioning apparatus 120 at the previous time to the current time. The angular acceleration of the work vehicle 100 can be calculated, for example, from the difference between the angular velocity of the work vehicle 100 at a certain time and the angular velocity of the work vehicle 100 at the time one cycle before. The change in the direction of the vehicle 110, that is, a vehicle direction can be calculated, for example, as described below.

Figure 7:
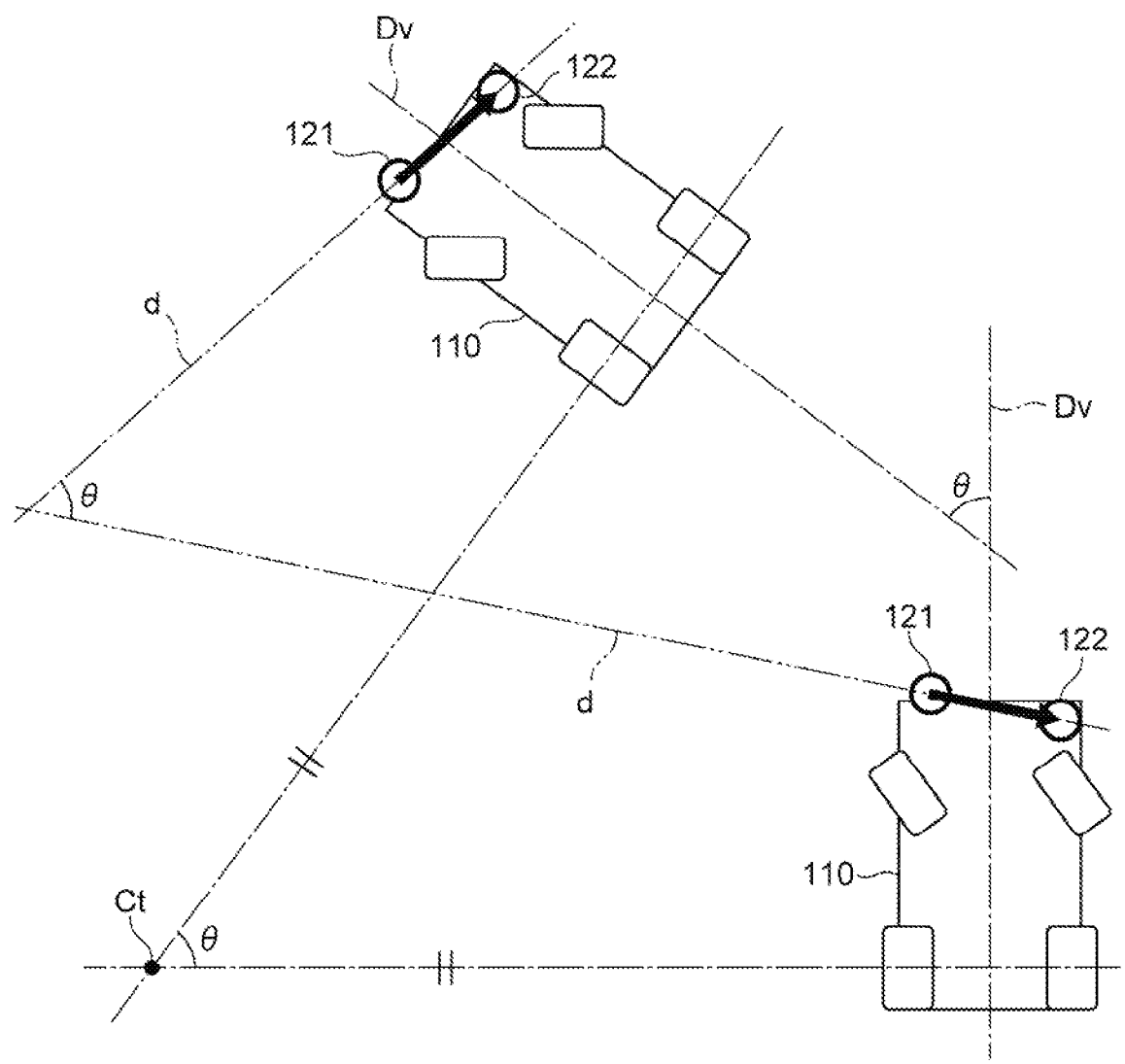
FIG. 7 is a schematic diagram illustrating the relation between a baseline direction between a first and second antennas and a vehicle direction.

FIG. 7 is a schematic diagram illustrating the relation between the baseline direction d connecting the first antenna 121 to the first antenna 121 and a vehicle direction Dv. In the example illustrated in FIG. 7, the work vehicle 100 moves by the vehicle 110 turning only at an angle θ along a circumference centering around a center Ct between the time when the position information p is acquired from the positioning apparatus 120 at the previous time to the current time. In this case, the vehicle direction Dv changes at an angle equal to the angle θ at which the vehicle 110 has turned. Similarly, the baseline direction d, that is, a baseline vector, also changes at the angle equal to the angle θ by which the vehicle 110 has turned.

Thus, the angle θ at which the vehicle direction Dv changes and the angle θ at which the baseline direction d changes are equal. Therefore, by calculating an angle change of the baseline direction d between at the current time and at the time when the position information p is acquired from the positioning apparatus 120 at the previous time, an angle change of the vehicle direction Dv can be calculated. That is, in Process P405, for example, by calculating the angle change of the baseline direction d, the control device 150 calculates the angle change of the vehicle direction Dv. As described above, in Process P405, the control device 150 calculates, for example, each average value of the angular velocity, the angular acceleration, and the acceleration of the work vehicle 100 and the angle change of the vehicle direction Dv.

Next, for example, the control device 150 performs Process P406 of determining whether or not the traveling state of the work vehicle 100 is the steady traveling. Here, the steady traveling is, for example, a state where the work vehicle 100 travels in a constant motion state. More specifically, the steady traveling of the work vehicle 100 includes, for example, turning in which the work vehicle 100 travels along a circumference having the same center and the same radius and straight advancing in which the work vehicle 100 travels in a straight line. Note that the steady traveling is not limited to the turning or the straight advancing and may include other traveling states.

In Process P406, for example, when the difference between the change of the vehicle direction Dv calculated in the previous Process P405 and a time integration of the angular velocity of the vehicle 100 is equal to or less than a threshold, the control device 150 determines that the work vehicle 100 is during the turning in which the work vehicle 100 travels along a circumference having the same center and the same radius. In this case, since the turning of the work vehicle 100 is included in the steady traveling, the control device 150 determines in Process P406 that the traveling state of the work vehicle 100 is the steady traveling (YES) and performs the next Process P407.

In Process P406, for example, when the average values of the angular acceleration and the acceleration of the vehicle 110 calculated in the previous Process P405 are equal to or less than thresholds, the control device 150 determines that the work vehicle 100 is during the straight advancing in which the work vehicle 100 travels in a straight line. In this case, since the straight advancing of the work vehicle 100 is included in the steady traveling, the control device 150 determines in Process P406 that the traveling state of the work vehicle 100 is the steady traveling (YES) and performs the next Process P407.

On the other hand, assume that the difference between the change of the vehicle direction Dv calculated in the previous Process P405 and the time integration of the angular velocity of the work vehicle 100 is greater than the threshold or the average values of the angular acceleration and the acceleration of the vehicle 110 are greater than the thresholds. In this case, in Process P406, the control device 150 determines that the traveling state of the work vehicle 100 is not the steady traveling (NO), performs the above-described Process P408 of setting the steady traveling flag to zero, and ends Process P4 illustrated in FIG. 6.

In Process P407, the control device 150 determines whether or not an absolute value |αave| of the average value of the angular velocity of the vehicle 110 calculated in the above-described Process P405 is smaller than a predetermined angular velocity threshold αth. In Process P407, when the control device 150 determines that the absolute value |αave| is smaller than the angular velocity threshold αth (YES), the control device 150 performs Process P409 of setting the steady traveling flag stored in the storage device to one and ends Process P4 illustrated in FIG. 6. The state where the steady traveling flag is one indicates that the traveling state of the work vehicle 100 is the straight advancing.

On the other hand, in Process P407, when the control device 150 determines that the absolute value |αave| is equal to or greater than the angular velocity threshold αth (NO), the control device 150 performs Process P410 of setting the steady traveling flag stored in the storage device to two and ends Process P4 illustrated in FIG. 6. The state where the steady traveling flag is two indicates that the traveling state of the work vehicle 100 is the turning in which the work vehicle 100 travels along a circumference having the same center and the same radius. After Process P4 ends, the control device 150 performs Process P5 illustrated in FIG. 3.

In Process P5, for example, the control device 150 determines whether or not the traveling state of the work vehicle 100 is the steady traveling by the detection function F106. Specifically, the control device 150 refers to the steady traveling flag that is set in the previous Process P4 and stored in the storage device by the detection function F106. When the referred steady traveling flag is zero, it indicates that the work vehicle 100 is not performing the steady traveling, and therefore, the control device 150 determines not being the steady traveling (NO) by the detection function F106 and performs Process P13 of estimating the location and the posture.

When the work vehicle 100 is not performing the steady traveling including the specific turning or straight advancing, in Process P13, the control device 150 estimates the location and the posture of the work vehicle 100 using the direction correction parameter stored in the storage device through the previous Process P6 to Process P12. Process P13 of estimating the location and the posture of the work vehicle 100 will be described in detail after Process P6 to Process P12 are described below.

In Process P5, when the referred steady traveling flag is one or two, it indicates that the work vehicle 100 is performing the steady traveling, and therefore, the control device 150 determines being the steady traveling (YES) by the detection function F106 and performs Process P6 of calculating the first vehicle direction. Here, the first vehicle direction is a direction of the vehicle 110 calculated based on the installation information of the first antenna 121 and the second antenna 122. The installation information includes, for example, coordinates of the positions where the first antenna 121 and the second antenna 122 are installed and is stored in the storage device of the control device 150 by the storage function F101 of the control device 150 illustrated in FIG. 2.

Figure 8:
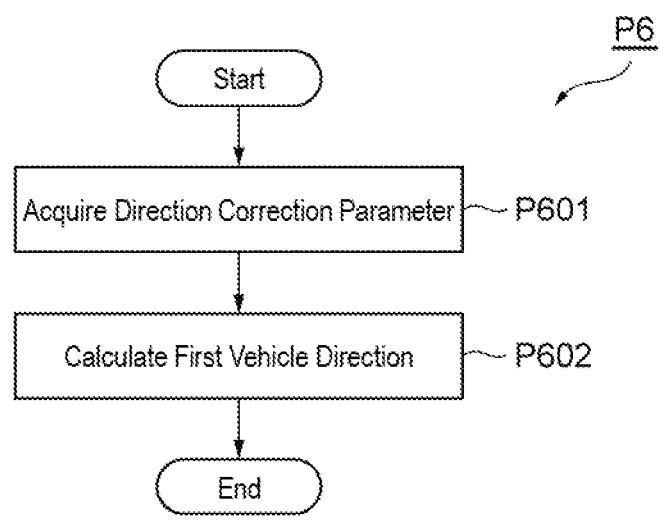
FIG. 8 is a flowchart of a process of calculating a first vehicle direction in FIG. 3.

FIG. 8 is a flowchart of Process P6 of calculating the first vehicle direction. Once starting Process P6 of calculating the first vehicle direction, for example, the control device 150 first performs Process P601 of acquiring the direction correction parameter by the calculation function F104. In Process P601, the control device 150 acquires by the calculation function F104, for example, the latest direction correction parameter stored in the storage device by the storage function F101.

Figure 9:
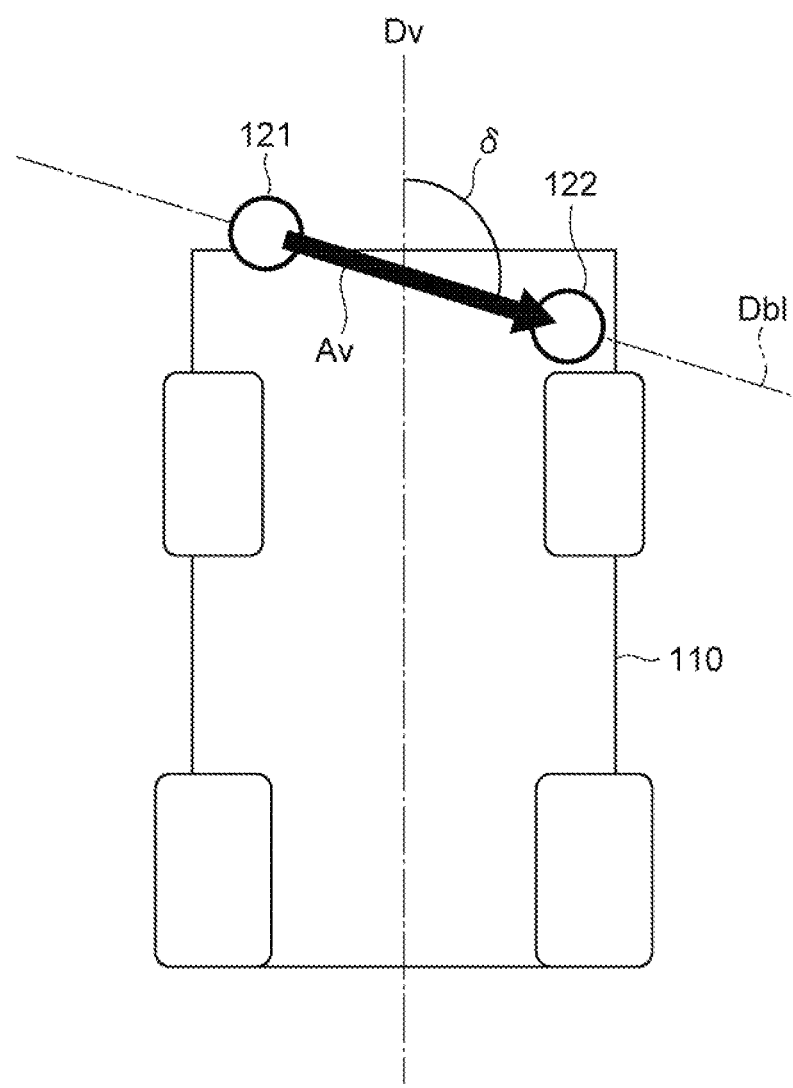
FIG. 9 is a schematic diagram describing a direction correction parameter acquired in a process in FIG. 8.

FIG. 9 is a schematic diagram describing the direction correction parameter acquired in Process P601 illustrated in FIG. 8. The first antenna 121 and the second antenna 122 are installed in the vehicle 110 and the positions are fixed. Based on the installation position of the first antenna 121 and the installation position of the second antenna 122 with respect to the vehicle 110, a vector Av heading from the first antenna 121 to the second antenna 122 can be obtained. The direction of the center line of the vehicle 110 parallel to the front-rear direction of the vehicle 110 is set to the vehicle direction Dv.

In this case, the installation information of the first antenna 121 and the second antenna 122 includes an antenna installation angle δ that is an angle formed by the vehicle direction Dv and the vector Av. The direction correction parameter is a parameter for correcting a change when the change occurs in the antenna installation angle δ due to some cause. Even though the installation positions of the first antenna 121 and the second antenna 122 are expressed in coordinates of the coordinate system fixed to the vehicle 110, the antenna installation angle δ and the direction correction parameter can be calculated similarly by, for example, performing coordinates transformation.

In Process P8 described later, the direction correction parameter is calculated by the calculation function F107 of the control device 150 and stored in the storage device by the storage function F108. In the storage device of the control device 150, for example, direction correction parameters for a certain period are stored with respective times. When Process P8 is not performed yet and the direction correction parameter is not calculated, zero as the initial value is stored in the storage device of the control device 150. When the direction correction parameter is zero, correction of the antenna installation angle δ is not performed.

Next, for example, the control device 150 performs Process P602 of calculating the first vehicle direction by the calculation function F104. Specifically, for example, the control device 150 calculates the vehicle direction Dv using a value in which the direction correction parameter is subtracted from the antenna installation angle δ illustrated in FIG. 9 and the vector Av illustrated in FIG. 9 by the calculation function F104 and ends Process P6 illustrated in FIG. 8. The vehicle direction Dv calculated in Process P6 is the first vehicle direction derived from the installation positions of the first antenna 121 and the second antenna 122. Next, as illustrated in FIG. 3, the control device 150 performs Process P7 of calculating the second vehicle direction by, for example, the calculation function F105.

Figure 10:
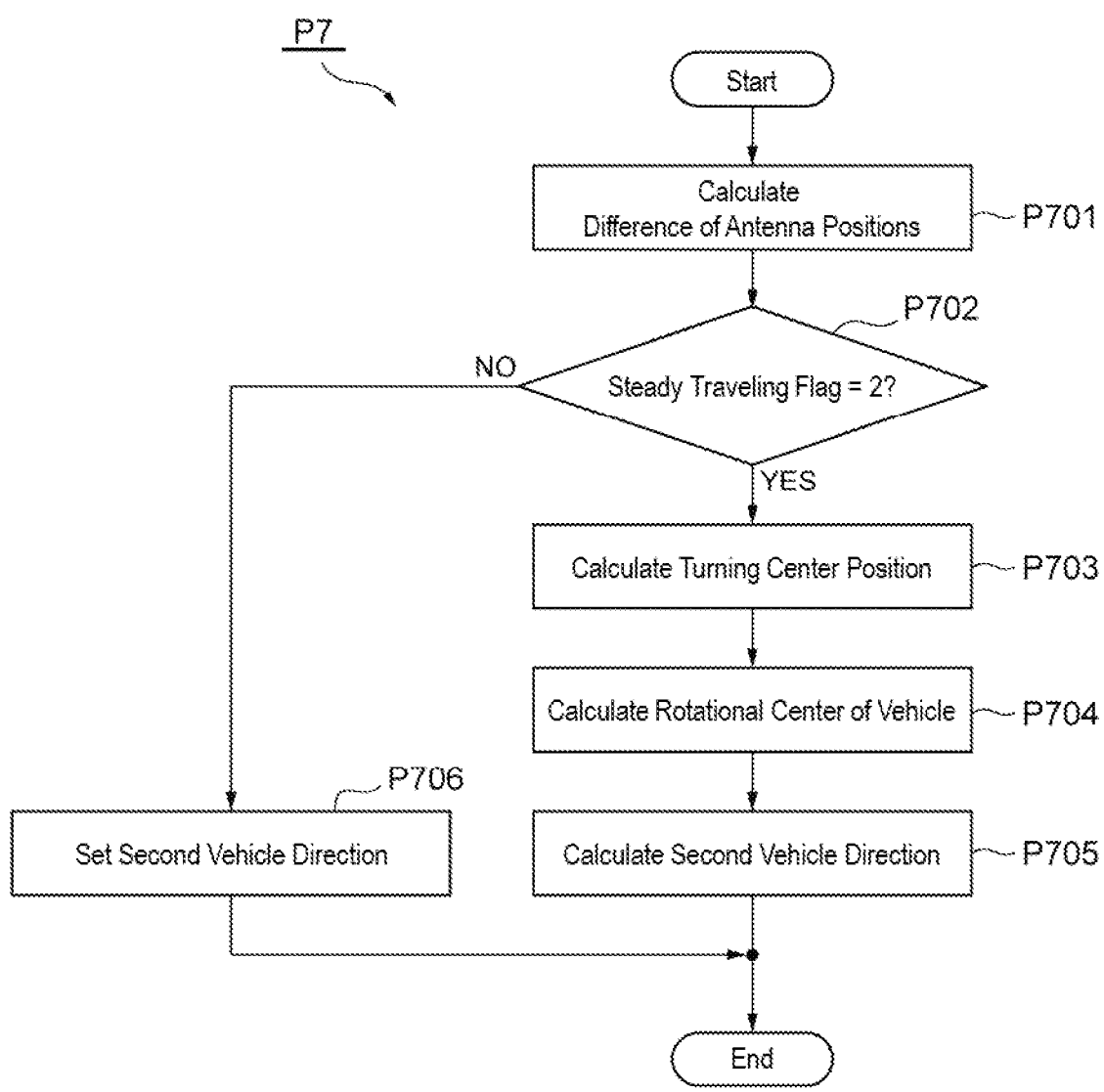
FIG. 10 is a flowchart of a process of calculating a second vehicle direction in FIG. 3.

FIG. 10 is a flowchart of Process P7 of calculating the second vehicle direction. Each process illustrated in FIG. 10 can be performed by, for example, the calculation function F105 of the control device 150. Once starting Process P7, the control device 150 first performs Process P701 of calculating the difference of antenna positions. In Process P701, the control device 150 acquires the position information p of the first antenna 121 that is input from the receiver 123 of the positioning apparatus 120 to the control device 150 and stored in the storage device by the storage function F102 of the control device 150. Here, the control device 150 acquires the current position information p of the first antenna 121 and the position information p of the first antenna 121 one cycle before.

Furthermore, in Process P701, the control device 150 calculates a moving direction of the vehicle 110 based on the difference between the current position information p of the first antenna 121 and the position information p of the first antenna 121 one cycle before. More specifically, the control device 150 calculates a moving vector of the vehicle 110 based on the difference between the current position information p of the first antenna 121 and the position information p of the first antenna 121 one cycle before.

Next, the control device 150 performs Process P702 of determining whether or not the steady traveling flag is two. In Process P702, assume that the control device 150 determines that the steady traveling flag is not two (NO), that is, that the steady traveling flag is one. In this case, the traveling state of the vehicle 110 is the straight advancing that is to travel in a straight line and the vehicle direction Dv and an advance direction of the vehicle 110 are corresponding. Therefore, the control device 150 performs Process P706 of setting the moving vector of the vehicle 110 calculated in the previous Process P701 as the second vehicle direction and ends Process P7 illustrated in FIG. 10.

On the other hand, in Process P702, assume that the control device 150 determines that the steady traveling flag is two (YES). In this case, the traveling state of the vehicle 110 is the turning that is to travel along a circle having the same center and radius. Therefore, the control device 150 performs Process P703 of calculating the position of the center of the turning of the vehicle 110.

Figure 11:
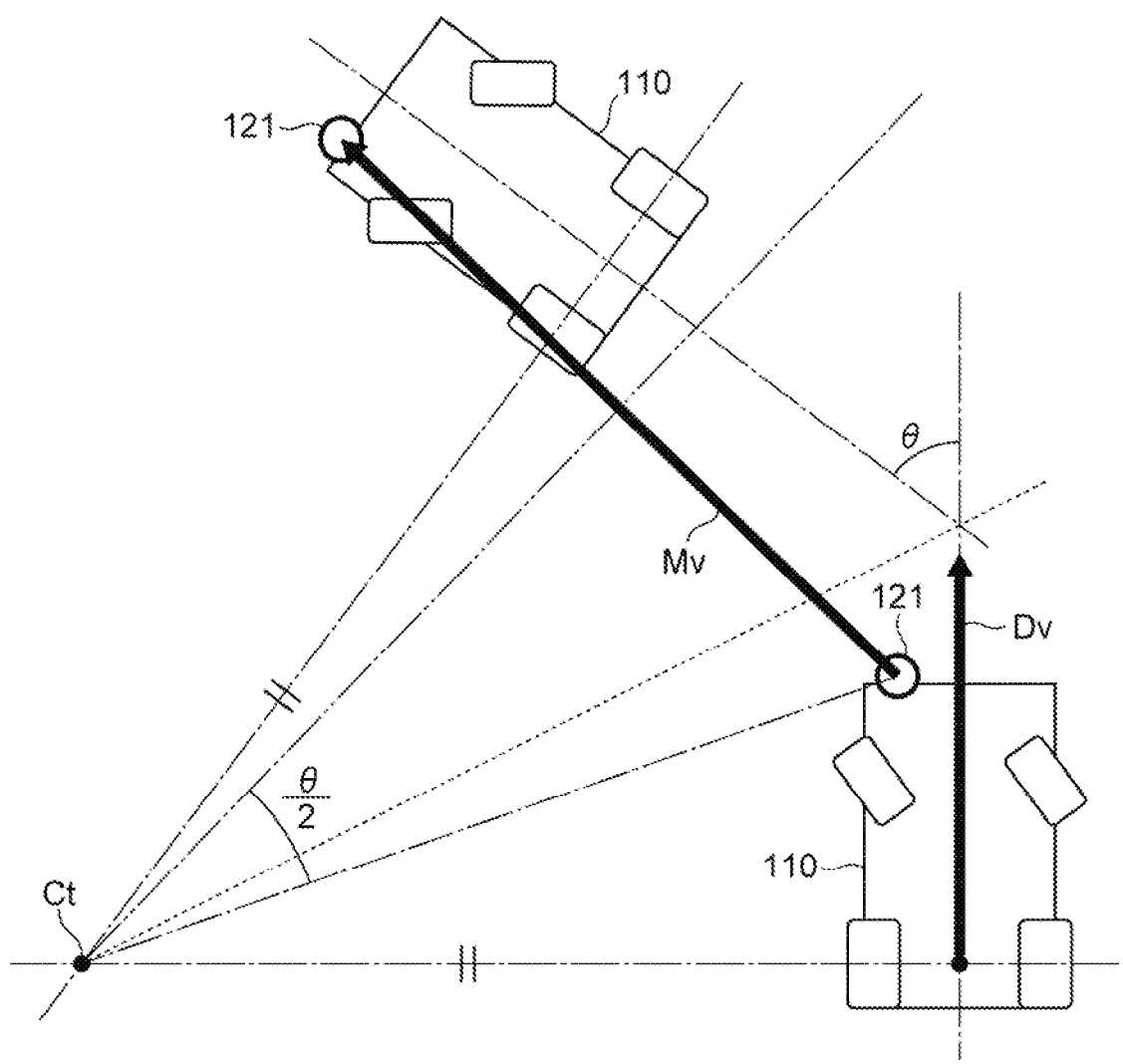
FIG. 11 is a schematic diagram illustrating one example of turning included in the steady traveling.

FIG. 11 is a schematic diagram illustrating one example of the turning included in the steady traveling of the work vehicle 100. In FIG. 11, the location at the current time of the vehicle 110 that turns in left turn (counterclockwise) around the center Ct and the location at the time one cycle before are illustrated. In Process P703, the control device 150 first calculates the vehicle direction Dv of the vehicle 110 at the time one cycle before based on the position information p of the first antenna 121 at the time one cycle before and the position information p of the first antenna 121 at the current time.

Here, the vehicle 110 turns along a circle having the same center Ct and radius. Therefore, the rotation angle of the vehicle 110 around the center Ct between the time one cycle before and the current time is equal to the angle θ between the vehicle direction Dv at the time one cycle before and the vehicle direction Dv at the current time. The center Ct of the turning of the vehicle 110 is on the bisector of a moving vector Mv calculated in the above-described Process P701. A distance D from the moving vector Mv to the center Ct of the turning can be obtained by the following formula (1), where L denotes the length of the moving vector Mv.

$$D = L / \{2 \times \tan(\theta/2)\} \qquad (1)$$

Accordingly, in Process P703, for example, the control device 150 can calculate the center Ct of the turning by calculating the normal line with respect to the moving vector Mv from the average of the angular velocity of the vehicle 110. Next, the control device 150 performs Process P704 of calculating a rotational center of the vehicle 110.

In Process P704, the control device 150 first calculates a vector heading from the position of the first antenna 121 to the rotational center of the vehicle 110. To this end, the control device 150 calculates a vector heading from the installation position of the first antenna 121 to the installation position of the acceleration sensor 132 and a vector heading from the installation position of the acceleration sensor 132 to the rotational center of the vehicle 110.

Figure 12:
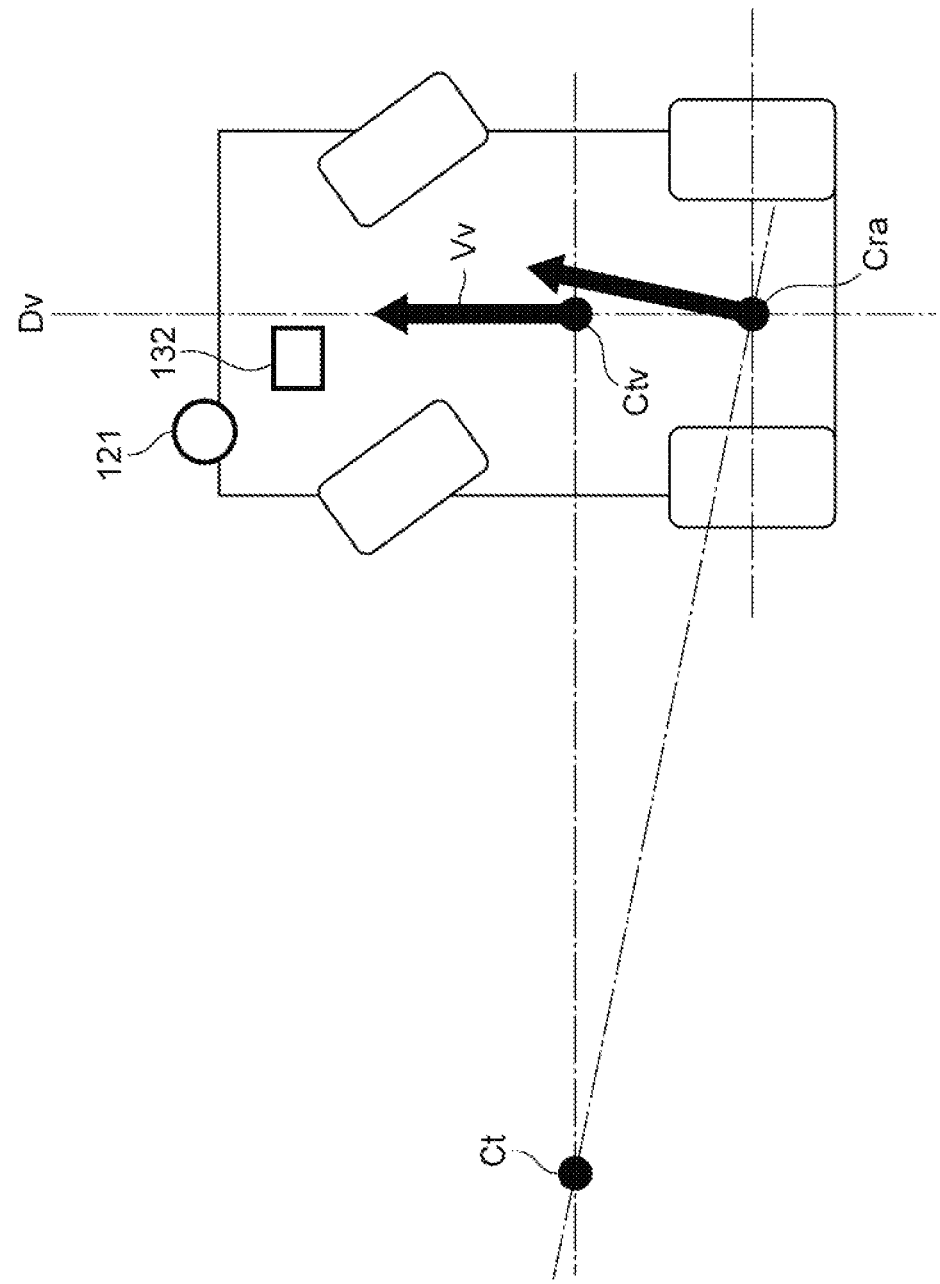
FIG. 12 is a schematic diagram describing a rotational center of the vehicle.

FIG. 12 is a schematic diagram describing a rotational center Ctv of the vehicle 110. The rotational center Ctv of the vehicle 110 is a point at which the direction of a velocity vector Vv of the vehicle 110 and the vehicle direction Dv are equalized considering the vehicle 110 as one rigid body. The direction of the velocity vector Vv of the vehicle 110 is the normal direction of a line segment connecting the center Ct of the turning of the vehicle 110 to the rotational center Ctv of the vehicle 110. The vector heading from the installation position of the acceleration sensor 132 to the rotational center Ctv of the vehicle 110 can be calculated as described below.

From the inside of the average value of the acceleration of the vehicle 110 calculated in the above-described Process P4, ax, which is a component of the front-rear direction of the vehicle 110, is extracted. Furthermore, an average value wz of the angular velocity in a yaw direction and a displacement g from the vehicle direction Dv are used. This can obtain the vector heading from the installation position of the acceleration sensor 132 to the rotational center Ctv of the vehicle 110 as (ax/(wz×wz),g).

With the above, the vector heading from the first antenna 121 to the acceleration sensor 132 and the vector heading from the acceleration sensor 132 to the rotational center Ctv of the vehicle 110 can be obtained. Furthermore, by adding these vectors, a vector heading from the first antenna 121 to the rotational center Ctv of the vehicle 110 can be obtained.

When the vehicle 110 is traveling at a low speed, a rear axle center Cra can be specified as the rotational center of the vehicle 110 in accordance with Ackermann geometry. In this case, based on the specifications of the vehicle 110, a vector from the first antenna 121 to the rear axle center Cra can be preliminarily calculated and stored in the storage device of the control device 150.

Furthermore, in Process P704, the control device 150 calculates the rotational center Ctv of the vehicle 110 using the vector heading from the first antenna 121 to the rotational center Ctv of the vehicle 110 and a vector of the baseline direction connecting the first antenna 121 to the second antenna 122. Specifically, centering around the position of the first antenna 121 one cycle before stored in the storage device of the control device 150 by the storage function F102, the vector heading from the first antenna 121 to the rotational center Ctv of the vehicle body frame 111 is rotated.

A rotating amount of the vector at this time is determined by, for example, calculating the first vehicle direction. Here, similarly to the above-described Process P602, for example, the first vehicle direction can be obtained using the value in which the direction correction parameter is subtracted from the antenna installation angle δ illustrated in FIG. 9 and the vector Av one cycle before that heads from the first antenna 121 to the second antenna 122. With the above, in Process P704, the control device 150 can calculate the rotational center Ctv of the vehicle 110.

Next, the control device 150 performs Process P705 of calculating the second vehicle direction. In Process P705, the control device 150 calculates the second vehicle direction based on the center Ct of the turning of the vehicle 110 calculated in the above-described Process P703 and the rotational center Ctv of the vehicle 110 calculated in the above-described Process P704 and ends Process P7 illustrated in FIG. 10.

The second vehicle direction calculated in Process P7 is a vehicle direction derived from the information output from the receiver 123 of the positioning apparatus 120. The second vehicle direction can be calculated as the normal direction obtained by the right-hand system with respect to a vector heading from the center Ct of the turning of the vehicle 110 to the rotational center Ctv of the vehicle 110. Next, the control device 150 performs Process P8 of calculating the direction correction parameter in FIG. 3.

Figure 13:
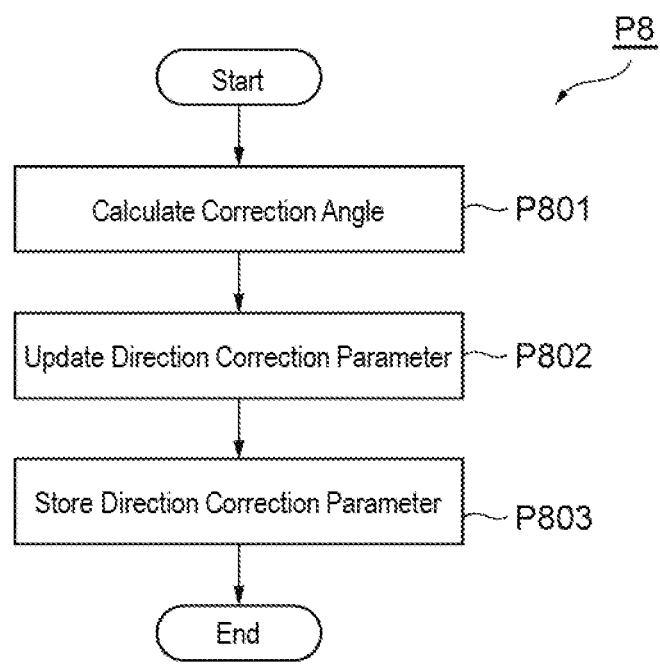
FIG. 13 is a flowchart of a process of calculating the direction correction parameter in FIG. 3.
Figure 14:
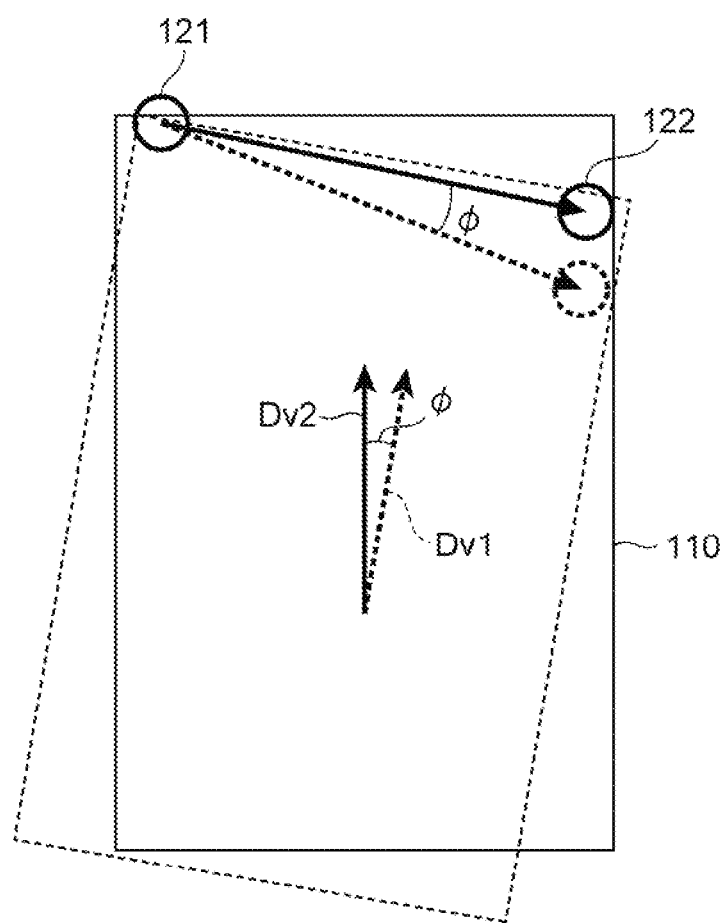
FIG. 14 is a schematic diagram describing the direction correction parameter.

FIG. 13 is a flowchart of Process P8 of calculating the direction correction parameter. FIG. 14 is a schematic diagram describing Process P8. Once starting Process P8, the control device 150 first performs Process P801 of calculating a correction angle φ. The correction angle φ is, for example, an angle formed by a first vehicle direction Dv1 and a second vehicle direction Dv2. Here, the first vehicle direction Dv1 is a vehicle direction derived from the installation positions of the first antenna 121 and the second antenna 122 and the second vehicle direction Dv2 is a vehicle direction derived from the position information p of the first antenna 121 output from the receiver 123 of the positioning apparatus 120.

That is, the first vehicle direction Dv1 is affected by an error of the installation positions of the first antenna 121 and the second antenna 122, whereas the second vehicle direction Dv2 is not affected by an error of the installation positions of the first antenna 121 and the second antenna 122. Accordingly, considering that the second vehicle direction Dv2 is the actual vehicle direction, the control device 150 calculates the difference between the first vehicle direction Dv1 and the second vehicle direction Dv2 by the calculation function F107 and calculates the correction angle φ to equalize the first vehicle direction Dv1 to the second vehicle direction Dv2.

Next, the control device 150 performs Process P802 of updating the direction correction parameter. In Process P802, for example, the control device 150 updates the direction correction parameter by adding the correction angle φ calculated in the previous Process P801 to the direction correction parameter stored in the storage device by the calculation function F107. Next, the control device 150 performs Process P803 of storing the direction correction parameter. In Process P803, for example, the control device 150 stores the direction correction parameter updated in the previous Process P802 in the storage device by the storage function F108 and ends Process P8 illustrated in FIG. 13.

Next, as illustrated in FIG. 3, for example, the control device 150 performs Process P9 of determining whether or not the direction correction parameter converges by the determination function F109. The second vehicle direction Dv2 is also used in Process P704 of calculating the rotational center Ctv of the vehicle 110 illustrated in FIG. 10. Therefore, an error that cannot be removed by the previous direction correction parameter occurs also in the second vehicle direction Dv2. In order to reduce the error, in Process P9, the control device 150 executes convergence operation by performing calculation again using the latest direction correction parameter calculated in the previous Process P8.

In Process P9, for example, when the absolute value of the correction angle φ calculated in Process P801 illustrated in FIG. 13 is smaller than a preliminarily set threshold, the control device 150 determines that the direction correction parameter converges (YES) and performs the next Process P10. On the other hand, in Process P9, for example, when the absolute value of the correction angle φ is equal to or greater than the preliminarily set threshold, the control device 150 determines that the direction correction parameter does not converge (NO) and repeatedly performs from Process P6 to Process P9.

Next, for example, the control device 150 performs Process P10 of calculating the average value of the direction correction parameter by the determination function F109. The direction correction parameter is calculated based on the position information p of the first antenna 121 input from the receiver 123 of the positioning apparatus 120 to the control device 150 every sampling cycle. Therefore, an error occurs also in the direction correction parameter by a position error that occurs when the receiver 123 performs positioning calculation based on the radio waves of GNSS that the first antenna 121 receives.

In order to remove the error of the direction correction parameter, in Process P10, the control device 150 performs sequential averaging of the direction correction parameter. In the sequential averaging of the direction correction parameter, for example, an excessive increase in the number of integrations may be suppressed by setting an upper limit of the number of integrations and introducing a forgetting coefficient. This allows the change of the direction correction parameter to be reflected without failure.

Next, for example, the control device 150 performs Process P11 of determining the availability of the direction correction parameter by the determination function F109. As described above, since the direction correction parameter calculated at each time includes an error, the average value of the direction correction parameters calculated in a predetermined period is calculated. Therefore, it is necessary that a certain number or more of the direction correction parameters have been calculated and variation of the direction correction parameters every cycle does not become excessive.

Accordingly, in Process P11, the control device 150 determines that the direction correction parameter is available (YES) when the number of calculated direction correction parameters is equal to or more than a predetermined threshold and the difference between the latest average of the direction correction parameters and the average one cycle before is equal to or less than a predetermined threshold. In this case, the control device 150 performs Process P12 of correcting the vehicle direction using the direction correction parameter, and based on the corrected vehicle direction, performs Process P13 of estimating the location and the posture of the vehicle 110 by the estimation function F110.

On the other hand, in Process P11, when the control device 150 determines that the direction correction parameter is not available (NO), the control device 150 performs Process P13 of estimating the location and the posture of the vehicle 110 by the estimation function F110 without using the direction correction parameter. Finally, the control device 150 performs Process P14 of outputting the average value of the direction correction parameters calculated in Process P10 and the location and the posture of the vehicle 110 estimated in Process P13 to the state monitoring function F200 via CAN. With the above, each process illustrated in FIG. 3 by the calculation function F100 of the control device 150 ends.

Next, the state monitoring function F200 of the control device 150 detects that an error occurs in the installation position of the first antenna 121 or the second antenna 122 based on the installation information of the first antenna 121 and the second antenna 122 and the direction correction parameter. Further, for example, when the direction correction parameter exceeds the predetermined threshold, the state monitoring function F200 of the control device 150 determines an abnormality in the installation positions of the first antenna 121 and the second antenna 122.

In this case, the work vehicle 100 may include an information notification device for notifying an operator or a user of information. As the information notification device, for example, a liquid crystal display unit, an indicator lamp, a speaker, a buzzer, and the like can be used. This allows the state monitoring function F200 of the control device 150 to output error information with respect to the installation information of the first antenna 121 and the second antenna 122 to the information notification device and notify the operator or the user of the work vehicle 100 of an abnormality when the direction correction parameter exceeds the predetermined threshold.

As described above, the work vehicle 100 of this embodiment includes the vehicle 110 and the first antenna 121 and the second antenna 122 that are mounted to the vehicle 110 and receive radio waves of a satellite positioning system. Further, the work vehicle 100 includes the receiver 123 that outputs the position information p of the first antenna 121 based on the radio waves of the satellite positioning system and the baseline direction d between the first antenna 121 and the second antenna 122. Further, the work vehicle 100 includes the sensors 130 that measure the velocity, the acceleration, and the angular velocity of the vehicle 110 and the control device 150 that estimates the location and the posture of the vehicle 110. The control device 150 has the detection function F106, the calculation function F104, the calculation function F105, the calculation function F107, and the estimation function F110. The detection function F106 is a function of detecting the steady traveling based on the velocity, the acceleration, and the angular velocity of the vehicle 110. The calculation function F104 is a function of calculating the first vehicle direction Dv1 based on the installation information of the first antenna 121 and the second antenna 122 with respect to the vehicle 110. The calculation function F105 is a function of calculating the second vehicle direction Dv2 based on a time change of the position information p of the first antenna 121 when the steady traveling is detected. The calculation function F107 is a function of calculating the direction correction parameter for correcting the first vehicle direction Dv1 based on the second vehicle direction Dv2. The estimation function F110 is a function of estimating the location and the posture of the vehicle 110 based on the direction correction parameter and the first vehicle direction Dv1.

With this configuration, the work vehicle 100 of this embodiment allows detecting an error in the installation positions of the first antenna 121 and the second antenna 122 more flexibly than a conventional device. More specifically, the first antenna 121 and the second antenna 122 are mounted to, for example, the leading ends of poles extending upward from the vehicle body frame 111 such that the radio waves from the satellite positioning system are not blocked by the vehicle 110 or the vessel 140. Further, for example, the work vehicle 100 loads ores, earth and sand, and the like on the vessel 140, unloads the loaded objects from the vessel 140, and travels on the ground having large unevenness in mines, construction sites, and the like. Therefore, vibration or impact acts on the first antenna 121 and the second antenna 122 in some cases. Then, with the passage of time, an error occurs between preliminarily set installation positions of the first antenna 121 and the second antenna 122 and the actual installation positions in some cases. In this case, an error occurs between the first vehicle direction Dv1 calculated based on the preliminarily set installation positions and the actual vehicle direction in some cases.

Therefore, as described above, the work vehicle 100 of this embodiment calculates the second vehicle direction Dv2 using the time change of the position information p of the first antenna 121 based on the radio waves of the satellite positioning system that the first antenna 121 receives when the steady traveling is detected by the detection function F106 of the control device 150. Then, the direction correction parameter for correcting the first vehicle direction Dv1 is calculated based on the second vehicle direction Dv2, and based on the direction correction parameter and the first vehicle direction Dv1, the location and the posture of the vehicle 110 are estimated. That is, the work vehicle 100 of this embodiment can correct an error between the first vehicle direction Dv1 and the actual vehicle direction Dv more flexibly by performing the steady traveling including not only extremely limited traveling states as a conventional device has but also more diverse traveling states. Further, a work for detecting an error that occurs in the installation positions of the first antenna 121 and the second antenna 122 becomes unnecessary.

In the work vehicle 100 of this embodiment, the control device 150 further has the determination function F109 of determining the availability of the direction correction parameter. The estimation function F110 of the control device 150 estimates the location and the posture of the vehicle 110 based on the direction correction parameter and the first vehicle direction Dv1 when the direction correction parameter is available. With this configuration, for example, correcting the first vehicle direction Dv1 based on the direction correction parameter including a large error is avoided, and the first vehicle direction Dv1 can be corrected more accurately.

In the work vehicle 100 of this embodiment, the steady traveling includes the turning that is to travel along a circumference having the same center and the same radius and the straight advancing that is to travel in a straight line. With this configuration, an error between the first vehicle direction Dv1 and the actual vehicle direction can be corrected more flexibly by performing the steady traveling including not only extremely limited traveling states, in which the work vehicle 100 advances in the front-rear direction on an approximately horizontal surface as a conventional device has, but also the turning and the straight advancing.

In the work vehicle 100 of this embodiment, the steady traveling has the average value of the velocity of the vehicle 110 higher than the predetermined velocity threshold Vth. With this configuration, a case where the vehicle 110 stops or a case where the vehicle 110 travels slowly at a velocity equal to or lower than the velocity threshold Vth are excluded from the steady traveling, and the location and the posture of the vehicle 110 can be estimated more accurately.

Further, the work vehicle 100 of this embodiment includes the vessel 140 mounted to the vehicle 110, the elevating cylinders 142 as an elevating mechanism that elevates the vessel 140, and the elevation sensor 134 that detects the height of the vessel 140. In the work vehicle 100 of this embodiment, the steady traveling has the height of the vessel 140 lower than the predetermined height threshold Hth.

With this configuration, in the work vehicle 100 of this embodiment, for example, when the front-end section 141a of the vessel main body 141 is equal to or higher than the height threshold Hth based on the height of the first antenna 121 and the second antenna 122, the second vehicle direction Dv2 is not calculated. Therefore, calculating the second vehicle direction Dv2 in a state where the radio wave from the satellite positioning system to the first antenna 121 or the second antenna 122 is blocked by the vessel 140 is avoided, and an error in the second vehicle direction Dv2 is reduced. Accordingly, with the work vehicle 100 of this embodiment, the location and the posture of the vehicle 110 can be estimated more accurately.

The work vehicle 100 of this embodiment can include an information notification device for notifying an operator or a user of information. In this case, when the direction correction parameter exceeds the predetermined threshold, the control device 150 can output error information with respect to the installation information of the first antenna 121 and the second antenna 122 to the information notification device. With this configuration, the work vehicle 100 of this embodiment allows notifying the operator or the user that an error in the installation positions of the first antenna 121 or the second antenna 122 occurs.

As described above, with this embodiment, the work vehicle 100 that allows detecting an error in the installation positions of the first antenna 121 or the second antenna 122 more flexibly than a conventional device can be provided.

Embodiment 2

Figure 15:
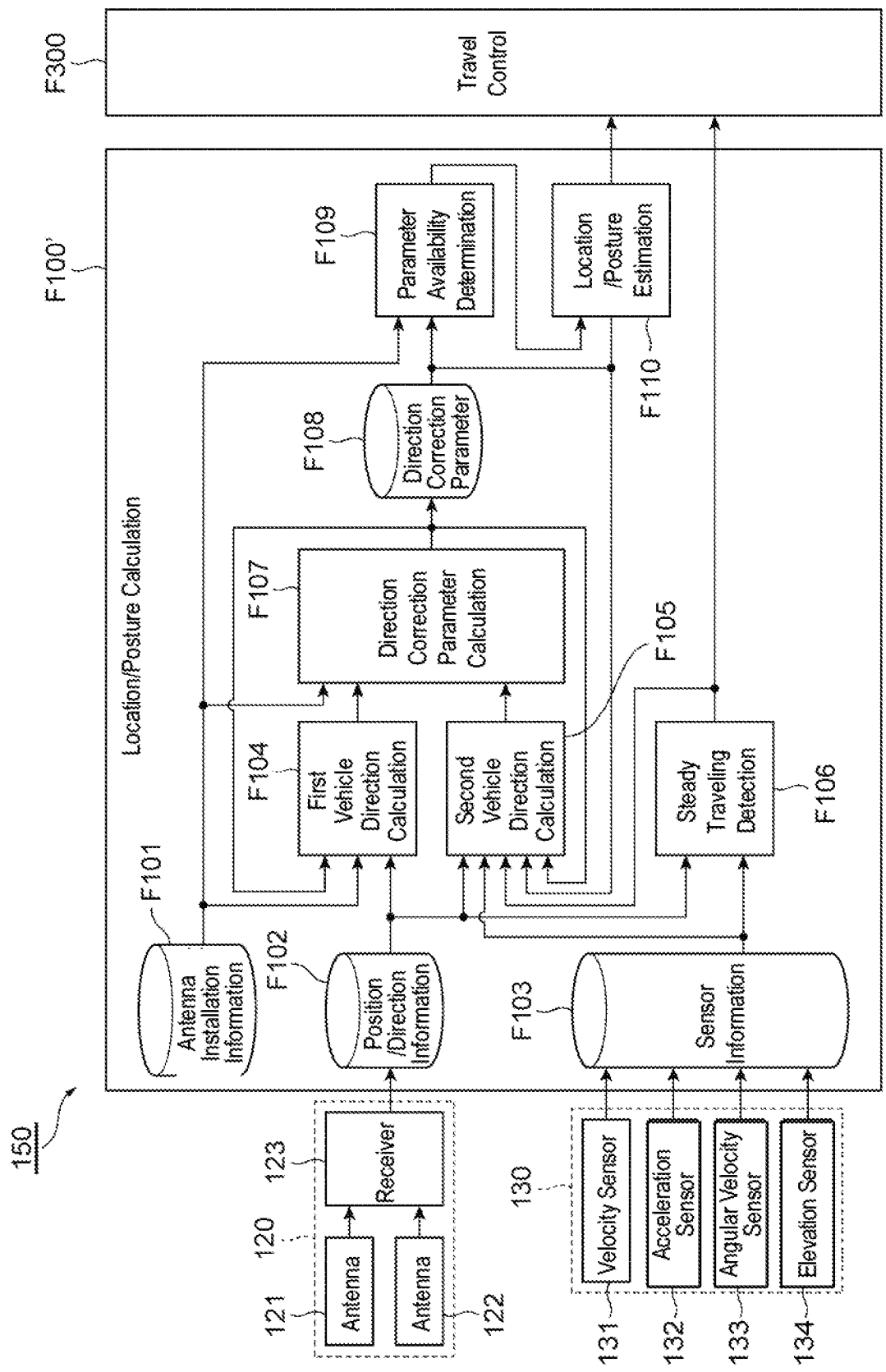
FIG. 15 is a function block diagram of a control device in Embodiment 2 of the work vehicle according to this disclosure.
Figure 16:
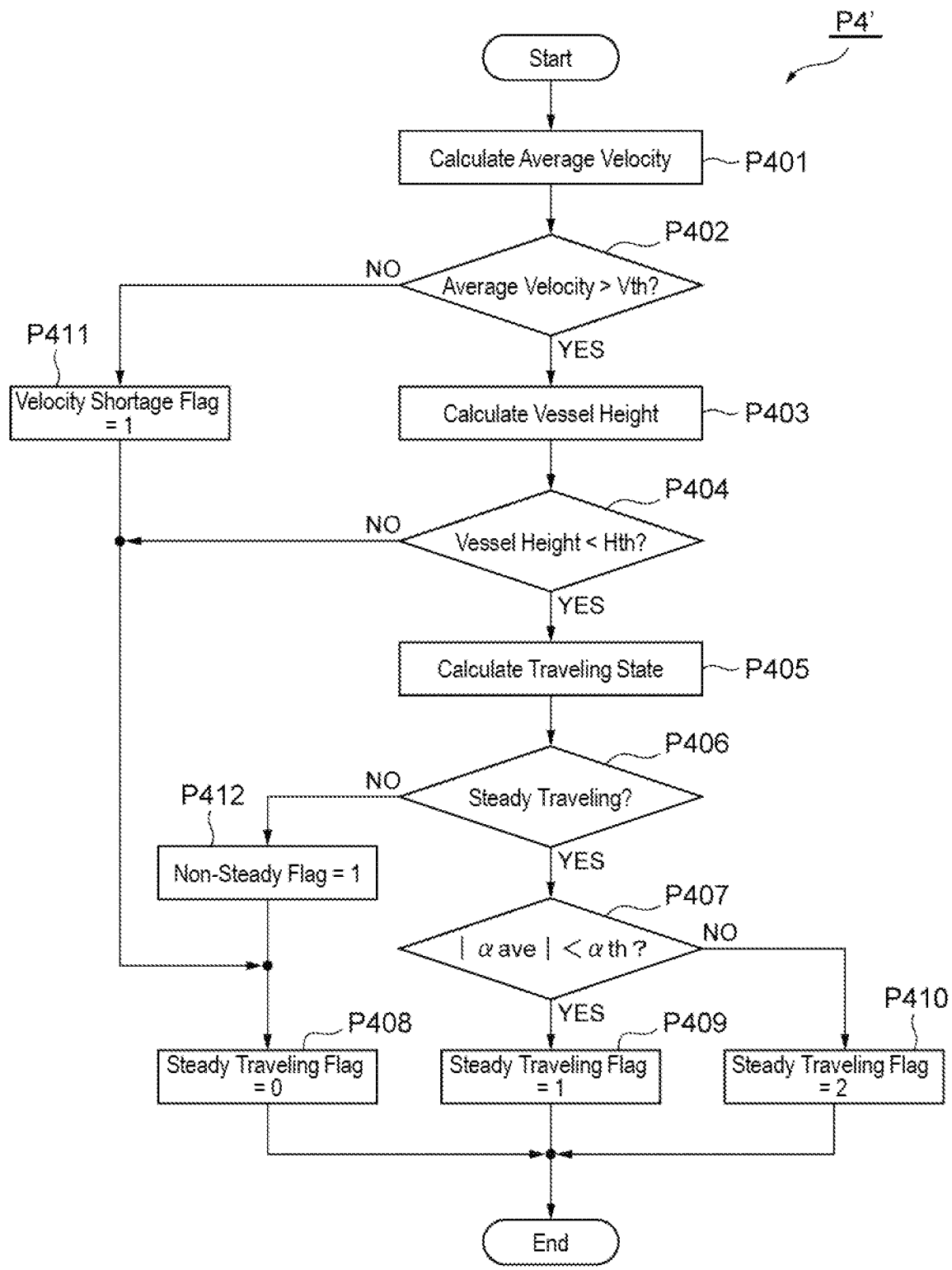
FIG. 16 is a flowchart illustrating one example of a process by a steady traveling detection function of the control device in FIG. 15.
Figure 17:
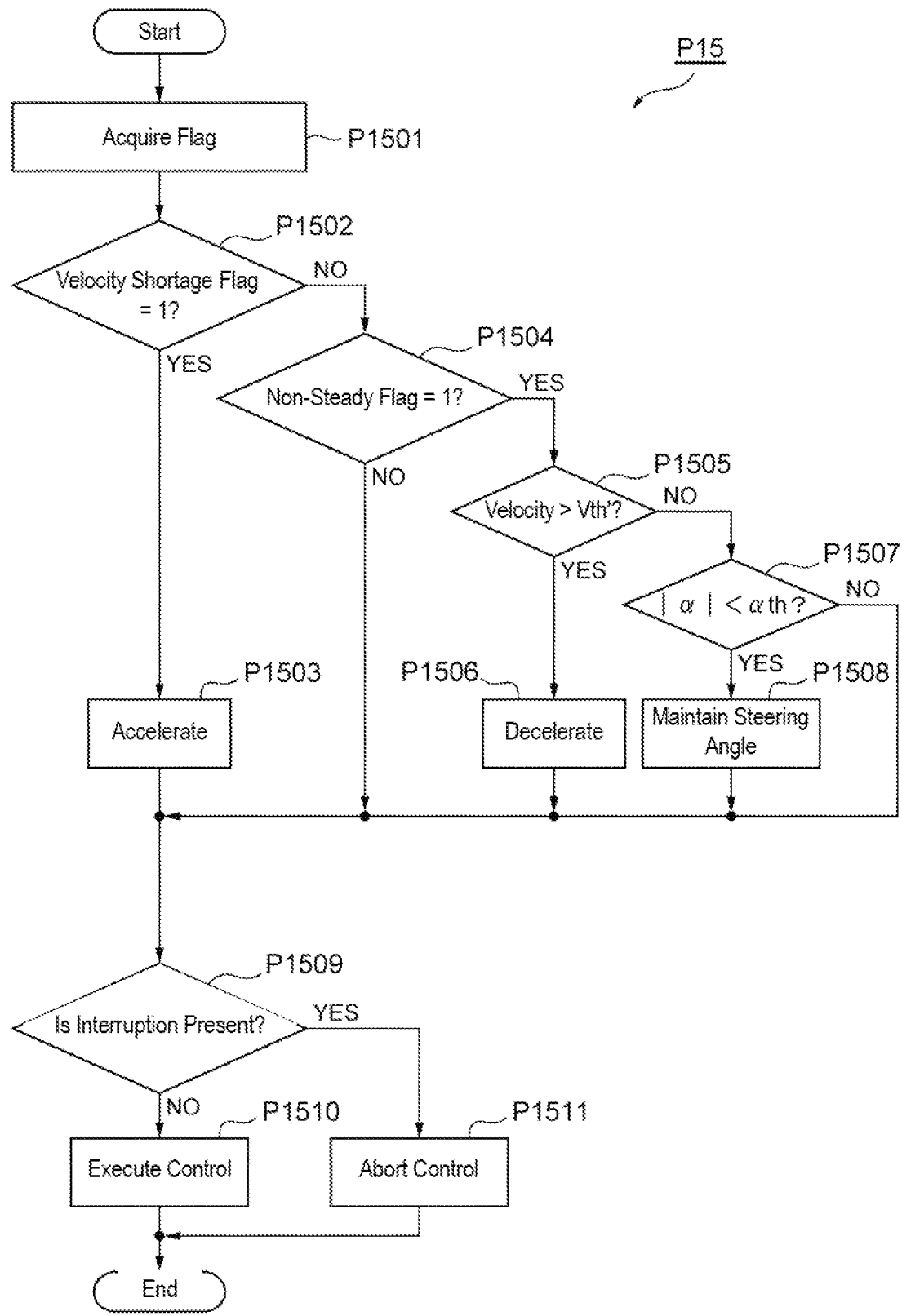
FIG. 17 is a flowchart illustrating one example of a process by a travel control function of the control device in FIG. 15.

The following will describe Embodiment 2 of the work vehicle according to this disclosure using a part of the drawings used in Embodiment 1 and with reference to FIG. 15 to FIG. 17. FIG. 15 is a function block diagram of the control device 150 illustrating Embodiment 2 of the work vehicle according to this disclosure. The work vehicle 100 of this embodiment is different from the work vehicle 100 of the above-described Embodiment 1 in functions that the control device 150 includes. Since other points of the work vehicle 100 of this embodiment are similar to those of the work vehicle 100 of the above-described Embodiment 1, the same reference numerals are given to similar sections and the descriptions are omitted.

In the work vehicle 100 of this embodiment, the control device 150 has a calculation function F100' for the location and the posture similar to the calculation function F100 of the above-described Embodiment 1. Further, in the work vehicle 100 of this embodiment, the control device 150 has a travel control function F300 instead of the state monitoring function F200. In the control device 150 of this embodiment, the calculation function F100' outputs an estimation result of the location and the posture of the vehicle 110 by the estimation function F110 and a detection result of the steady traveling by the detection function F106 to the travel control function F300.

The travel control function F300 executes travel control of the vehicle 110 based on the estimation result and the detection result input from the calculation function F100'. More specifically, the travel control function F300 controls various actuators of the vehicle 110 and automatically operates an accelerator pedal, a brake pedal, a transmission, a steering wheel, and the like of the vehicle 110 to cause the vehicle 110 to travel. In the work vehicle 100 of this embodiment, for example, the control device 150 performs Process P4' of detecting the steady traveling illustrated in FIG. 16 by the detection function F106 instead of Process P4 of detecting the steady traveling illustrated in FIG. 3 and FIG. 4.

FIG. 16 is a flowchart illustrating one example of Process P4' by the detection function F106 of the control device 150 of this embodiment. In Process P4' illustrated in FIG. 16, the same reference numerals are given to processes similar to those of Process P4 of Embodiment 1 illustrated in FIG. 6 and the descriptions are omitted.

In Process P402 of Process P4' illustrated in FIG. 16, when the control device 150 determines that the average velocity of the vehicle 110 is equal to or lower than the predetermined velocity threshold Vth (NO), the control device 150 performs Process P411 of setting a velocity shortage flag stored in the storage device to one by, for example, the detection function F106. The state where the velocity shortage flag is set to one indicates a state where the direction correction parameter cannot be calculated because the velocity of the vehicle 110 is insufficient. After Process P411 ends, the control device 150 performs Process P408 of setting the steady traveling flag to zero similarly to the above-described Embodiment 1.

In Process P406 of Process P4' illustrated in FIG. 16, when the control device 150 determines that the traveling state of the vehicle 110 is not the steady traveling (NO), the control device 150 performs Process P412 of setting a non-steady flag stored in the storage device to one by, for example, the detection function F106. The state where the non-steady flag is set to one indicates a state where the traveling state of the vehicle 110 is not the steady traveling and the direction correction parameter cannot be calculated. After Process P412 ends, the control device 150 performs Process P408 of setting the steady traveling flag to zero similarly to the above-described Embodiment 1.

Note that the velocity shortage flag and the non-steady flag have initial values of zero and are simultaneously initialized at the activation of the control device 150 every sampling cycle. When the velocity shortage flag or the non-steady flag is set to one, the direction correction parameter is not calculated and an estimation error in the posture of the work vehicle 100 increases. Therefore, the control device 150 of this embodiment executes the travel control of the vehicle 110 by the travel control function F300 such that the traveling state of the vehicle 110 becomes the steady traveling.

FIG. 17 is a flowchart illustrating one example of Process P15 by the travel control function F300 of the control device 150 in the work vehicle 100 of this embodiment. Once starting Process P15 illustrated in FIG. 17, the control device 150 first performs Process P1501 of acquiring the velocity shortage flag and the non-steady flag stored in the storage device.

Next, the control device 150 performs Process P1502 of determining whether or not the velocity shortage flag is one. In Process P1502, when the control device 150 determines that the velocity shortage flag is one (YES), it can be deemed that the velocity of the vehicle 110 is insufficient and the direction correction parameter cannot be calculated. In this case, the control device 150 performs Process P1503 of setting a travel control parameter that accelerates the vehicle 110 to a predetermined velocity exceeding the velocity threshold Vth. After Process P1503 ends, the control device 150 performs Process P1509 of determining the presence or absence of interruption described later.

On the other hand, in Process P1502, when the control device 150 determines that the velocity shortage flag is not one (NO), the control device 150 performs Process P1504 of determining whether or not the non-steady flag is one. In Process P1504, when the control device 150 determines that the non-steady flag is not one (NO), it can be deemed that the traveling state of the vehicle 110 is the steady traveling in which the direction correction parameter can be calculated, and therefore, the control device 150 performs Process P1509 of determining the presence or absence of interruption described later.

On the other hand, in Process P1504, when the control device 150 determines that the non-steady flag is one (YES), the control device 150 performs Process P1505 of determining whether or not the velocity of the vehicle 110 is higher than a predetermined velocity threshold Vth'. In Process P1505, when the control device 150 determines that the velocity of the vehicle 110 is higher than the velocity threshold Vth' (YES), the control device 150 performs Process P1506 of setting a travel control parameter that decelerates the vehicle 110 such that the velocity of the vehicle 110 falls within the velocity of the steady traveling. After Process P1506 ends, the control device 150 performs Process P1509 of determining the presence or absence of interruption described later.

On the other hand, in Process P1505, when the control device 150 determines that the velocity of the vehicle 110 is equal to or lower than the predetermined velocity threshold Vth' (NO), it can be deemed that the velocity of the vehicle 110 has no margin of adjustment. In this case, the control device 150 performs Process P1507 of determining whether or not an absolute value $|\alpha|$ of the angular velocity of the vehicle 110 is lower than the predetermined angular velocity threshold $\alpha$th. In Process P1507, when the control device 150 determines that the absolute value $|\alpha|$ of the angular velocity of the vehicle 110 is lower than the predetermined angular velocity threshold $\alpha$th (YES), it can be deemed that the vehicle 110 is advancing in a straight line. In this case, the control device 150 performs Process P1508 of setting a travel control parameter that maintains a steering angle of the steering wheel. After Process P1508 ends, the control device 150 performs Process P1509 of determining the presence or absence of interruption described later.

On the other hand, in Process P1507, when the control device 150 determines that the absolute value $|\alpha|$ of the angular velocity of the vehicle 110 is equal to or higher than the predetermined angular velocity threshold $\alpha$th (NO), the control device 150 performs Process P1509 of determining the presence or absence of interruption. In Process P1509, the control device 150 determines whether or not an interruption signal that stops the control is input from another control device and whether or not an interruption of an operation of the vehicle 110 by an operator of the vehicle 110 is present.

In Process P1509, when the control device 150 determines that an interruption is absent (NO), the control device 150 performs Process P1510 of executing the travel control of the vehicle 110 based on the parameters set in the above-described Processes P1503, P1506, or P1508 and ends Process P15 illustrated in FIG. 17. On the other hand, in Process P1509, when the control device 150 determines that an interruption is present (YES), the control device 150 performs Process P1511 of aborting the travel control of the vehicle 110 based on the parameters set in the above-described Processes P1503, P1506, or P1508 and ends Process P15 illustrated in FIG. 17.

As described above, in the work vehicle 100 of this embodiment, the control device 150 has the travel control function F300 that controls traveling of the vehicle 110. When the steady traveling of the vehicle 110 is not detected by the detection function F106, the travel control function F300 controls the vehicle 110 so as to satisfy conditions of the steady traveling. With this configuration, the work vehicle 100 of this embodiment not only allows providing the effect similar to that of the work vehicle 100 of Embodiment 1, but also allows the control device 150 to control the traveling state of the vehicle 110 to the steady traveling and calculate the direction correction parameter more reliably.

While the embodiments of the work vehicle according to this disclosure have been described in detail with reference to the drawings, the specific configuration is not limited to the embodiments. Design changes and the like within a scope not departing from the gist of this disclosure are included in this disclosure.

REFERENCE SIGNS LIST

100 Work vehicle
110 Vehicle
121 First antenna
122 Second antenna
123 Receiver
130 Sensor
134 Elevation sensor
140 Vessel
142 Elevating cylinder (Elevating mechanism)
150 Control device
Ct Center
d Baseline direction
Dv1 First vehicle direction
Dv2 Second vehicle direction
F104 Function of calculating first vehicle direction
F105 Function of calculating second vehicle direction
F106 Detection function
F107 Function of calculating direction correction parameter
F109 Function of determining availability of direction correction parameter
F110 Estimation function
F300 Travel control function
Hth Height threshold
p Position information

The invention claimed is:

1. A work vehicle comprising:
a vehicle;
a first antenna and a second antenna mounted to the vehicle to receive a radio wave of a satellite positioning system;
a receiver that outputs position information of the first antenna based on the radio wave and a baseline direction between the first antenna and the second antenna;
a sensor that measures a velocity, an acceleration, and an angular velocity of the vehicle; and
a control device that estimates a location and a posture of the vehicle,
wherein the control device has:
a detection function of detecting a steady traveling based on the velocity, the acceleration, and the angular velocity, the steady traveling including consists a turning traveling to travel along a circumference having a same center and a same radius and a straight advancing traveling to travel in a straight line, the steady traveling having an average value of the velocity higher than a predetermined velocity threshold;
a function of calculating a first vehicle direction based on installation information of the first antenna and the second antenna with respect to the vehicle;
a function of setting a moving vector calculated based on a difference between the current position information of the first antenna and the position information of the first antenna one cycle before as a second vehicle direction when the steady traveling was detected as the straight advancing traveling,
a function of calculating a second vehicle direction based on a turning center and a rotational center of the vehicle when the steady traveling was detected as the turning traveling;
a function of calculating a direction correction parameter for correcting the first vehicle direction based on the second vehicle direction; and
an estimation function of estimating the location and the posture of the vehicle based on the direction correction parameter and the first vehicle direction.

2. The work vehicle according to claim 1,
wherein the control device further has a function of determining availability of the direction correction parameter, and
wherein the estimation function estimates the location and the posture of the vehicle based on the direction correction parameter and the first vehicle direction when the direction correction parameter is available.

3. The work vehicle according to claim 1, comprising:
a vessel mounted to the vehicle;
an elevating mechanism that elevates the vessel; and
an elevation sensor that detects a height of the vessel,
wherein the steady traveling has the height of the vessel lower than a predetermined height threshold.

4. The work vehicle according to claim 1, comprising an information notification device for notifying an operator of information,
wherein the control device outputs error information with respect to the installation information of the first antenna and the second antenna to the information notification device when the direction correction parameter exceeds a predetermined threshold.

5. The work vehicle according to claim 1,
wherein the control device has a travel control function controlling traveling of the vehicle, and
wherein the travel control function controls the vehicle so as to satisfy a condition of the steady traveling when the steady traveling is undetected by the detection function.

* * * * *